United States Patent
Dhanuka et al.

(10) Patent No.: US 11,755,817 B2
(45) Date of Patent: Sep. 12, 2023

(54) SYSTEMS FOR GENERATING SNAP GUIDES RELATIVE TO GLYPHS OF EDITABLE TEXT

(71) Applicant: Adobe Inc., San Jose, CA (US)

(72) Inventors: Praveen Kumar Dhanuka, Howrah (IN); Arushi Jain, Delhi (IN); Shivi Pal, Noida (IN)

(73) Assignee: Adobe Inc., San Jose, CA (US)

( * ) Notice: Subject to any disclaimer, the term of this patent is extended or adjusted under 35 U.S.C. 154(b) by 61 days.

(21) Appl. No.: 17/391,536

(22) Filed: Aug. 2, 2021

(65) Prior Publication Data

US 2023/0035439 A1 Feb. 2, 2023

(51) Int. Cl.
*G06F 40/109* (2020.01)
*G06F 3/04842* (2022.01)
*G06F 40/166* (2020.01)

(52) U.S. Cl.
CPC ........ *G06F 40/109* (2020.01); *G06F 3/04842* (2013.01); *G06F 40/166* (2020.01)

(58) Field of Classification Search
CPC ... G06F 40/109; G06F 40/166; G06F 3/04842
See application file for complete search history.

(56) References Cited

U.S. PATENT DOCUMENTS

| 10,319,129 | B2* | 6/2019 | Dhanuka | G06T 3/403 |
| 11,244,486 | B2 | 2/2022 | Agrawal et al. | |
| 2011/0007970 | A1* | 1/2011 | Saund | G06V 30/155 |
| | | | | 382/176 |
| 2013/0093794 | A1* | 4/2013 | Dairman | G01C 23/00 |
| | | | | 345/672 |
| 2019/0317980 | A1* | 10/2019 | Dhanuka | G06F 40/109 |
| 2020/0026501 | A1* | 1/2020 | Baldwin | G06F 3/167 |

OTHER PUBLICATIONS

"Anchored objects", Adobe, Inc. [retrieved Nov. 1, 2022]. Retrieved from the Internet <https://helpx.adobe.com/in/indesign/using/anchored-objects.html>., Apr. 12, 2022, 16 Pages.
Dhanuka, Praveen Kumar, et al., "US Application as Filed", U.S. Appl. No. 17/391,536, filed Aug. 2, 2021, 73 pages.
Bentley, J.L. , et al., "Algorithms for Reporting and Counting Geometric Intersections", IEEE Transactions on Computers, vol. C-28, No. 9 [retrieved Jun. 15, 2023]. Retrieved from the Internet <http://www.itseng.org/research/papers/topics/VLSI_Physical_Design_Automation/Physical_Verification/DRC/Geometric_Intersection_Problems/1979-Bentley.pdf>., Sep. 1979, 5 Pages.

* cited by examiner

*Primary Examiner* — Kyle R Stork
(74) *Attorney, Agent, or Firm* — FIG. 1 Patents

(57) ABSTRACT

In implementations of systems for generating snap guides relative to glyphs of editable text rendered in a user interface using a font, a computing device implements a snap guide system to receive input data describing a position of a cursor relative to the glyphs of the editable text in the user interface. The glyphs of the editable text are enclosed within a bounding box having a height that is less than a height of an em-box of the font. The snap guide system generates a first group of snap guides for the glyphs of the editable text which includes a snap guide for each side of the bounding box and a snap guide for an x-height of the font. The snap guide system generates an indication of a particular snap guide of the first group of snap guides for display in the user interface based on the position of the cursor.

20 Claims, 21 Drawing Sheets

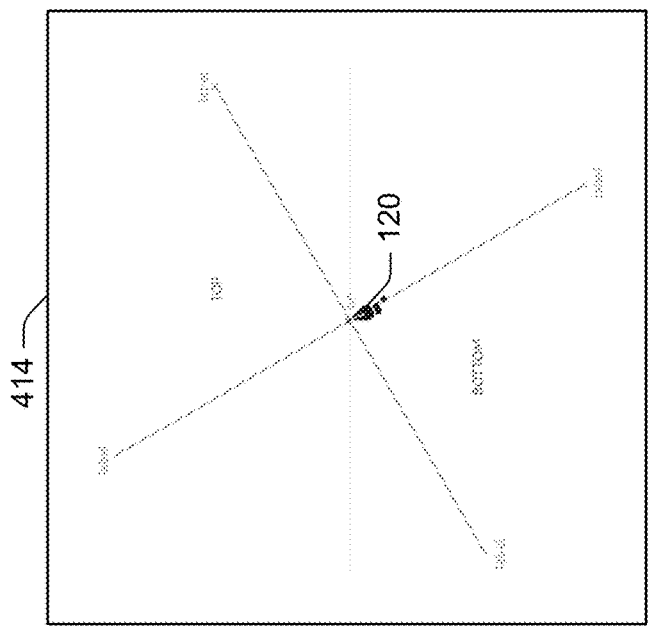
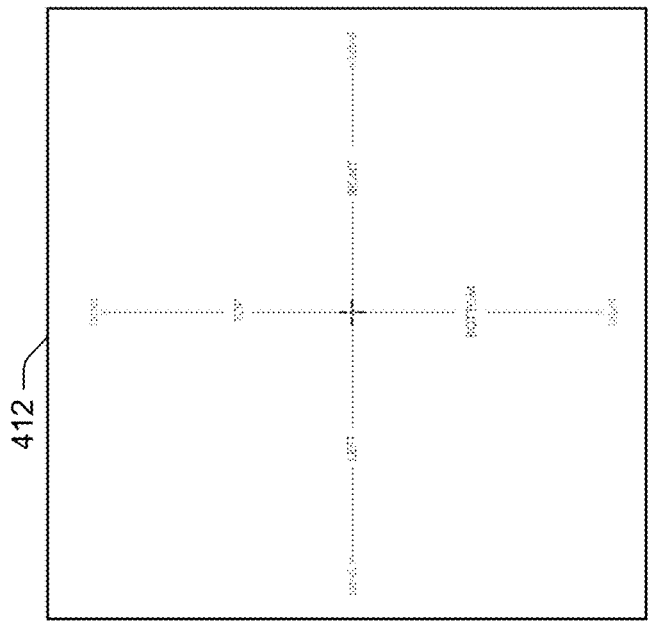
Fig. 4A

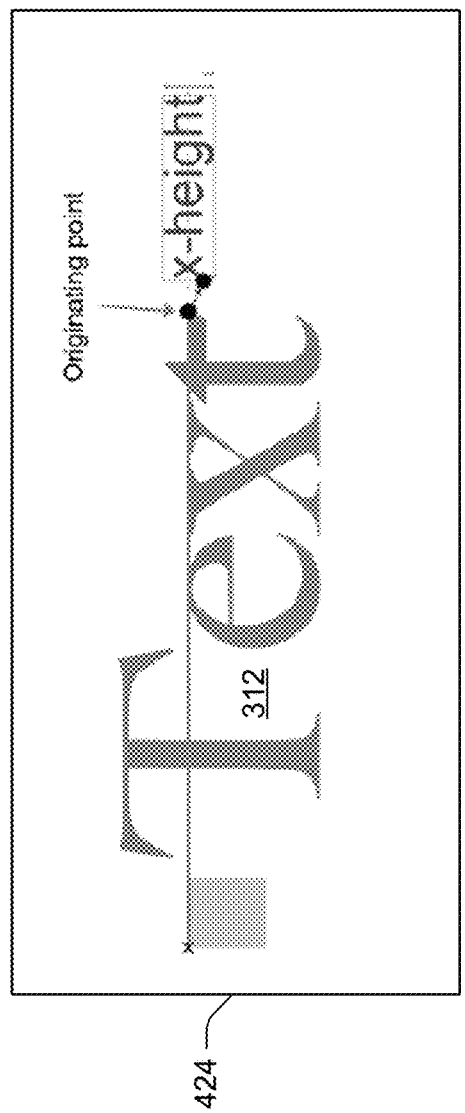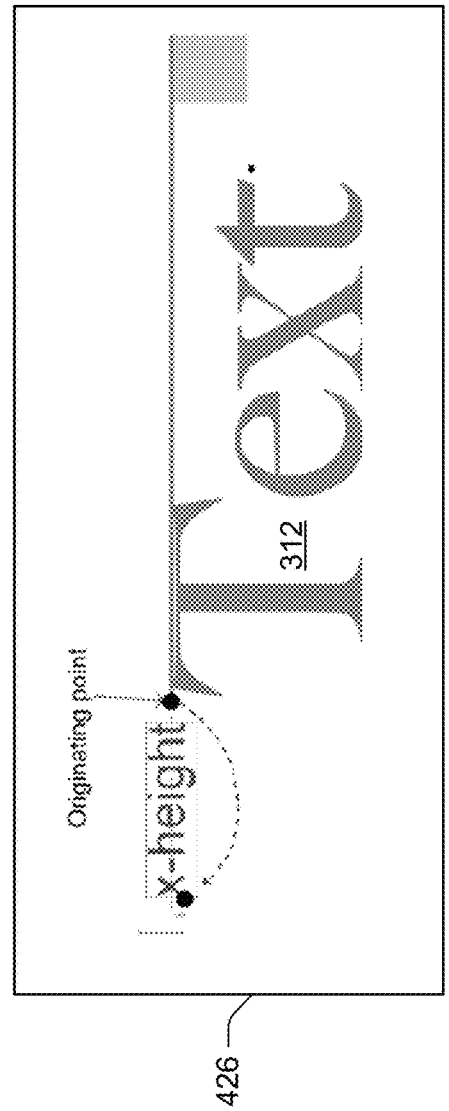
Fig. 4C

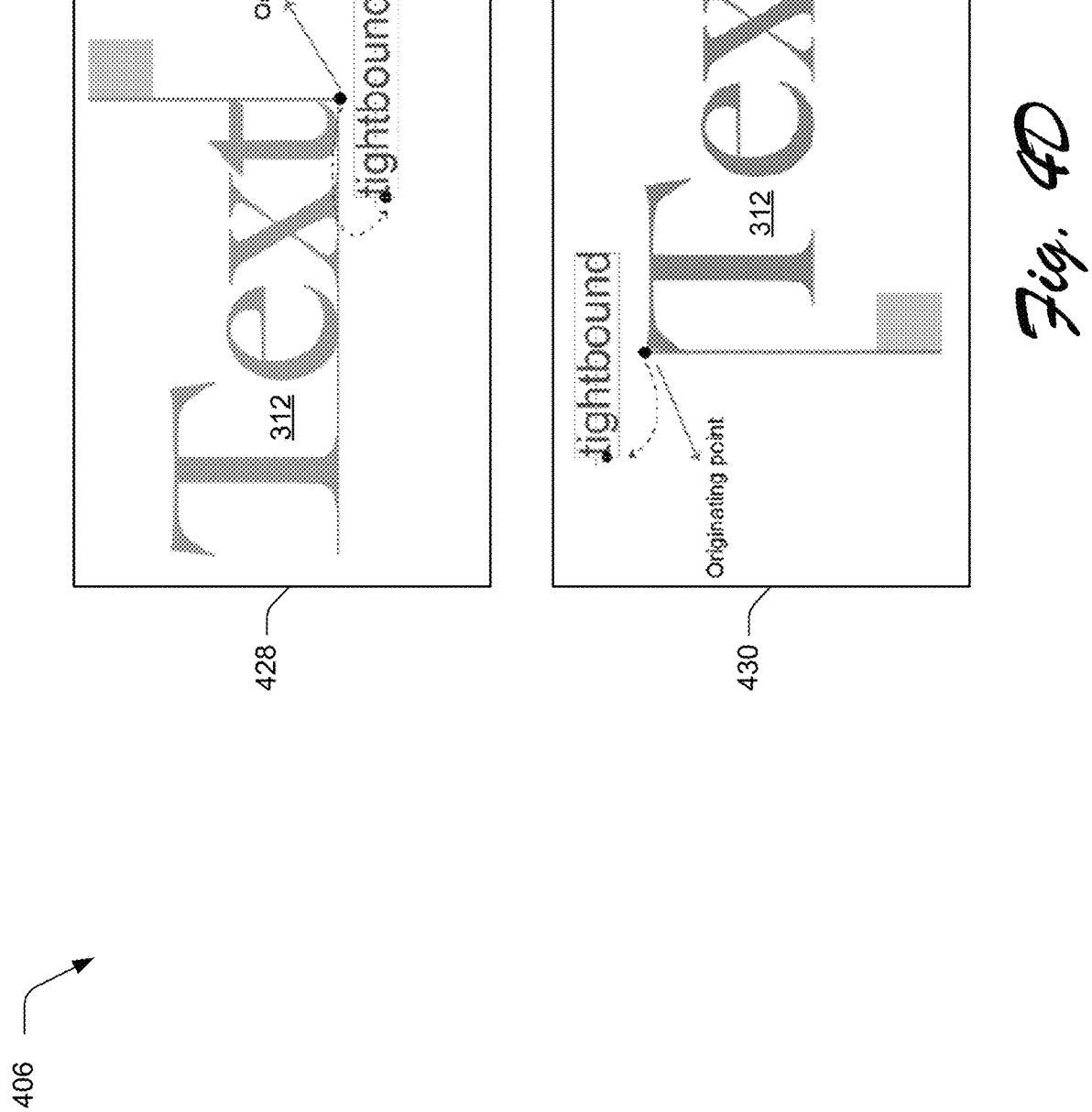

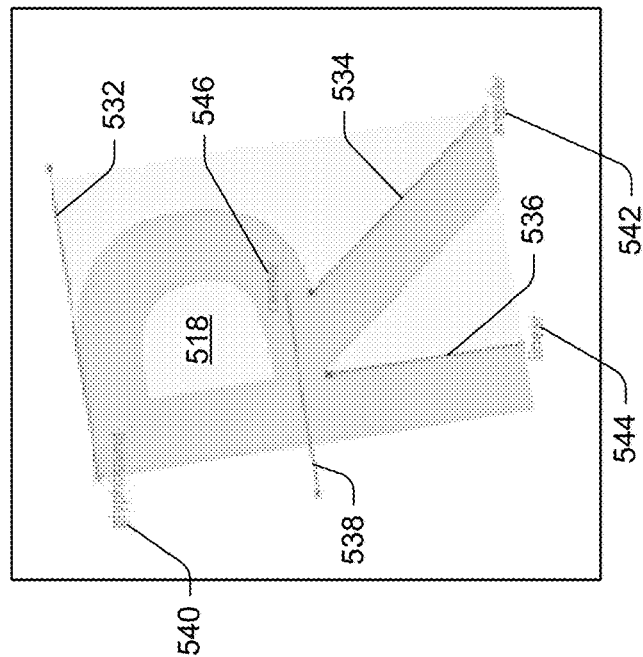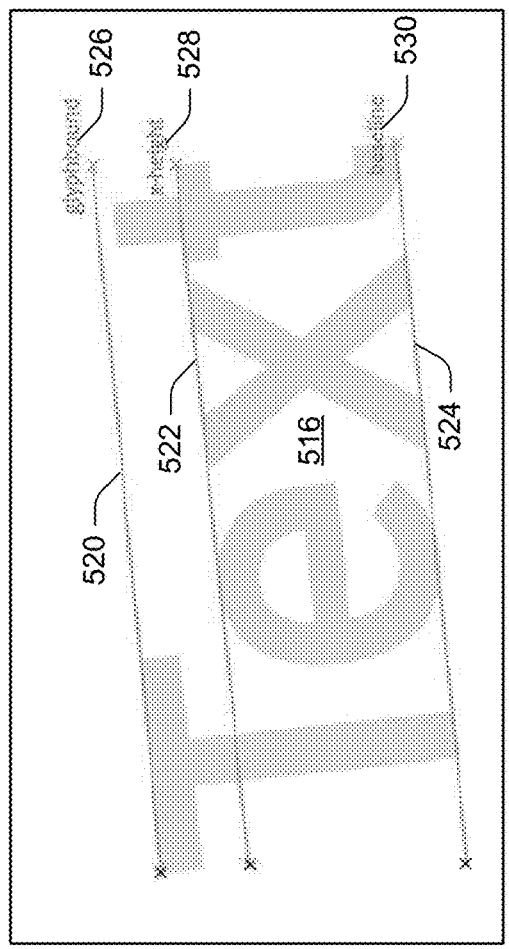
Fig. 5C

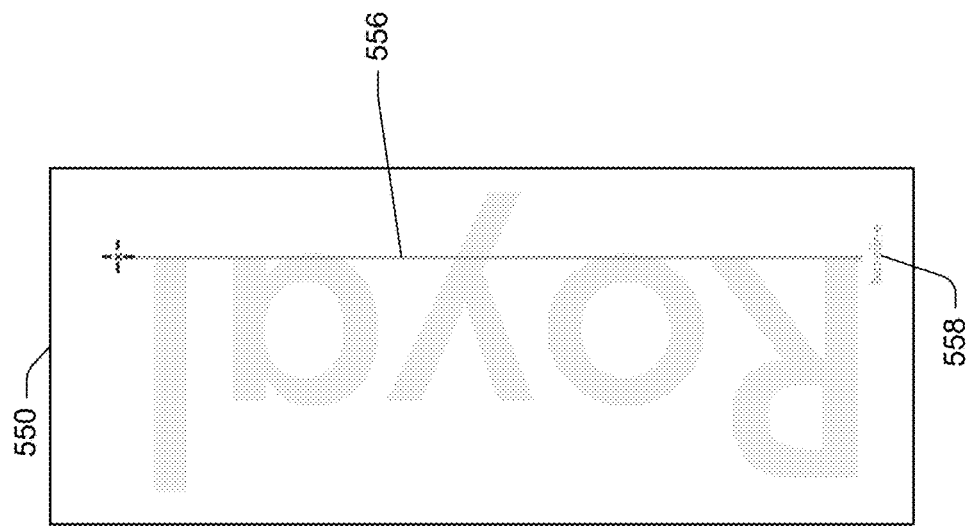
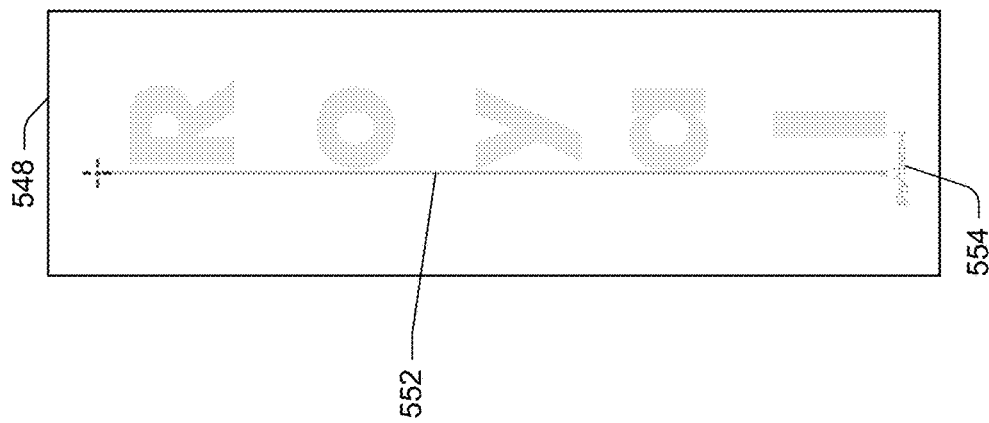
Fig. 5D

600

602
Receive input data describing a position of a cursor relative to glyphs of editable text rendered in a user interface using a font

604
Enclose the glyphs of the editable text within a bounding box having a height that is less than a height of an em-box of the font

606
Generate a first group of snap guides for the glyphs of the editable text, the first group of snap guides including a snap guide for each side of the bounding box and a snap guide for an x-height of the font

608
Generate an indication of a particular snap guide of the first group of snap guides for display in the user interface based on the position of the cursor

*Fig. 6*

SYSTEMS FOR GENERATING SNAP GUIDES RELATIVE TO GLYPHS OF EDITABLE TEXT

BACKGROUND

A snap guide is a defined region in a user interface that causes a cursor or a portion of an object that is within a threshold proximity of the snap guide in the user interface to relocate such that the cursor or the portion of the object is collocated with the snap guide in the user interface. Conventional systems generate snap guides for all contours of objects to facilitate precise alignment between portions of the objects. However, this precise alignment becomes challenging in scenarios in which the objects include many contours within a close proximity in the user interface such as glyphs of a font.

In these scenarios, conventional systems generate so many snap guides that the user interface becomes "cluttered" with snap guides which makes it difficult to utilize any particular one of the many snap guides. For example, a single position of the cursor in the user interface can be within a threshold proximity of multiple different ones of the many snap guides. This is because conventional systems are not capable of filtering the many snap guides or identifying a subset of the many snap guides which only includes snap guides for important visual features of the glyphs.

SUMMARY

Techniques and systems are described for generating snap guides relative to glyphs of editable text. In an example, a computing device implements a snap guide system to receive input data describing a position of a cursor relative to glyphs of editable text rendered in a user interface using a font. For instance, a user interacts with an input device (e.g., a mouse, a stylus, etc.) to manipulate the cursor in the user interface.

The snap guide system encloses the glyphs of the editable text within a bounding box having a height that is less than a height of an em-box of the font. For example, the snap guide system generates a first group of snap guides for the glyphs of the editable text which includes a snap guide for each side of the bounding box and a snap guide for an x-height of the font. The snap guide system generates an indication of a particular snap guide of the first group of snap guides for display in the user interface based on the position of the cursor.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, 3D, 3E, and 3F illustrate examples of generating snap guides relative to glyphs of editable text.

FIG. 6 is a flow diagram depicting a procedure in an example implementation in which input data is received describing a position of a cursor relative to glyphs of editable text rendered in a user interface using a font and an indication of a particular snap guide is generated for display in the user interface.

DETAILED DESCRIPTION

Overview

Figure 1:
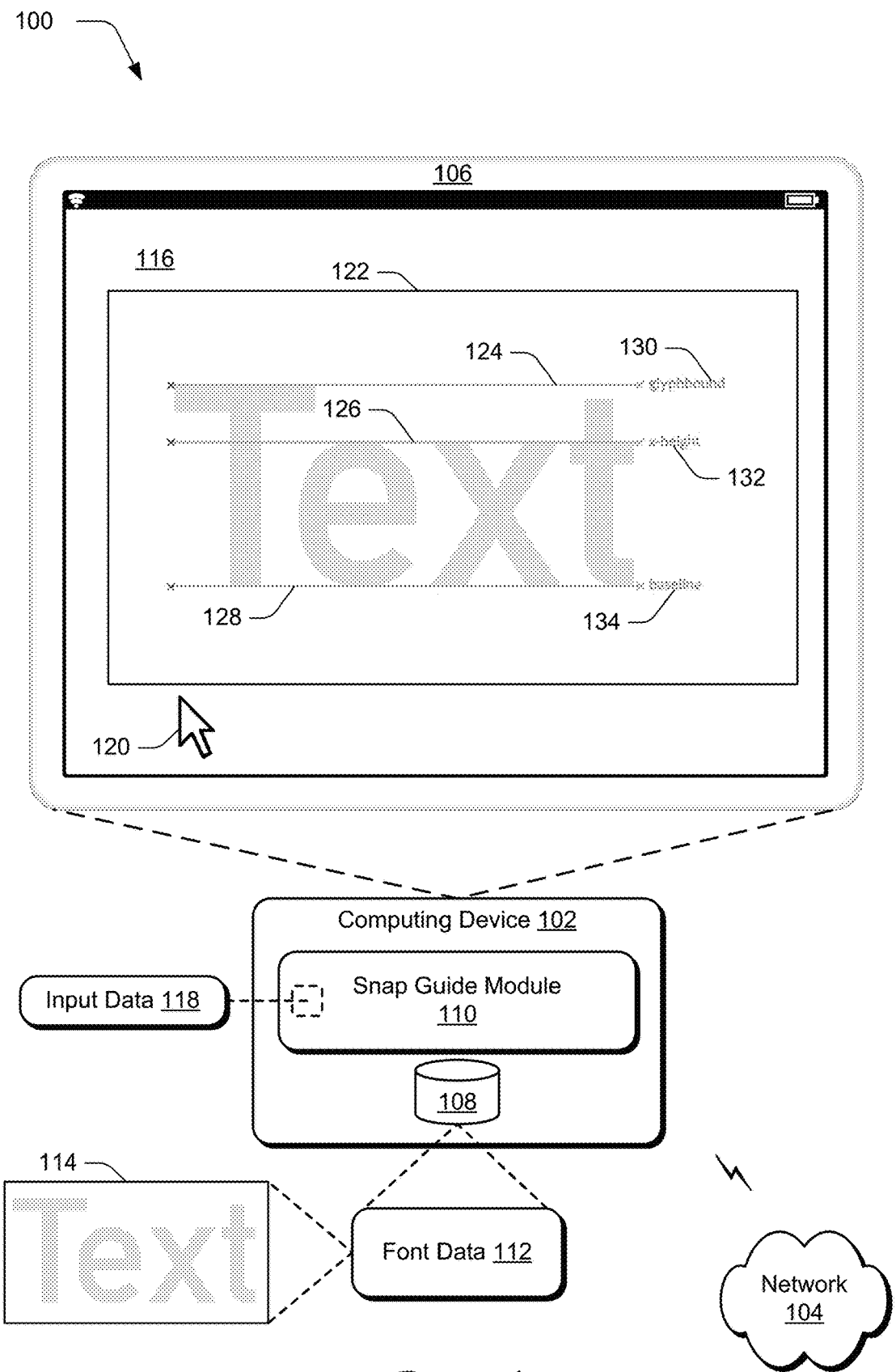
FIG. 1 is an illustration of an environment in an example implementation that is operable to employ digital systems and techniques for generating snap guides relative to glyphs of editable text as described herein.

Conventional systems generate a snap guide for each contour included as part of a digital object rendered in a user interface. When generating snap guides for digital objects that include many contours within a close proximity in the user interface such as for glyphs of a font, conventional systems generate so many snap guides that the user interface becomes "cluttered" with the many snap guides. With the user interface "cluttered" in this manner, it is difficult to utilize any particular one of the many snap guides. This is because conventional systems are not capable of filtering the many snap guides or identifying a subset of the many snap guides which only includes snap guides for important visual features of the glyphs. In order to overcome the limitations of conventional systems, techniques and systems are described for generating snap guides relative to glyphs of editable text.

In one example, a computing device implements a snap guide system to receive input data describing a position of a cursor relative to glyphs of editable text rendered in a user interface using a font. For instance, a user interacts with an input device (e.g., a mouse, a stylus, a touch screen, and so forth) to manipulate the cursor in the user interface. The snap guide system accesses font data which describes a font file of the font as well as font files of other fonts. The snap guide system uses the font data to generate a first group of snap guides for important visual features of the font and a second group of snap guides for important visual features of the glyphs of the editable text.

To do so, the snap guide system uses outline information included in the font file of the font to enclose the glyphs of the editable text within a bounding box. In an example, the bounding box has a height that is less than a height of an em-box of the font. For example, the snap guide system leverages the font file of the font to generate the first group of snap guides for the glyphs of the editable text. This first group of snap guides includes a snap guide for each side of the bounding box, a snap guide for an x-height of the font, and a snap guide for a baseline of the font.

The snap guide system determines an ascender and a descender of the font using information included in the font file. In one example, the snap guide system combines a glyph bounding box for an uppercase and a lowercase glyph of the font and uses the combined bounding box to determine the ascender and the descender of the font. The snap guide system then divides the bounding box into visual regions based on the ascender, the descender, and the x-height of the font. For example, the snap guide system determines locations of the visual regions using the ascender, the descender, and the x-height of the font.

The snap guide system generates candidate snap guides to include in the second group of snap guides based on portions of the glyphs of the editable text included in the visual regions. To do so in one example, the snap guide system determines whether an extreme portion of a glyph is included in each of the visual regions. If a visual region does not include an extreme portion of a glyph, then no snap guide is included in the second group of snap guides for the visual region. If a particular visual region includes a single extreme portion of a glyph, then the snap guide system generates a snap guide for the single extreme portion of the glyph and includes the snap guide in the second group of snap guides. If the particular visual region includes multiple extreme portions of glyphs, then the snap guide system generates a candidate snap guide for each of the multiple extreme portions. The snap guide system then determines which candidate snap guide of the multiple candidate snap guides has a greatest area of intersection with the glyphs of the editable text and includes that candidate snap guide in the second group of snap guides.

The snap guide system also generates labels for snap guides included in the first group of snap guides as well as for snap guides included in the second group of snap guides. For example, the labels indicate whether each of the snap guides is included in the first group of snap guides or the second group of snap guides. The snap guide system displays the labels in the user interface based on the position of the cursor in the user interface. In one example, the snap guide system displays a label for a snap guide adjacent to an end of the snap guide which is furthest from the position of the cursor in the user interface.

The snap guide system compares the position of the cursor in the user interface with positions of the snap guides included an each of the first and second groups of snap guides. For instance, the snap guide system compares the position of the cursor with the positions of the snap guides in the user interface to determine whether the position of the cursor is within a threshold proximity of any of the snap guides. In response to determining that the position of the cursor is within a threshold proximity of a particular snap guide of the first group of snap guides or the second group of snap guides, the snap guide system generates an indication of the particular snap guide for display in the user interface.

By generating the first and second groups of snap guides, the described systems provide intuitive snap guide functionality for the glyphs of the editable text. The described systems provide this functionality without "cluttering" the user interface with too many snap guides which is an improvement relative to conventional systems that are limited to generating a snap guide for each contour included as part of a digital object. Additionally, the described systems are capable of generating snap guides for important visual features the glyphs of the editable text and for the font used to render the glyphs of the editable text which is not possible using conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. As depicted in FIG. 1, the computing device 102 includes a storage device 108 and a snap guide module 110. For instance, the storage device 108 is accessible to the snap guide module 110, and the snap guide module 110 is capable of transmitting and receiving data via the network 104.

The storage device 108 is illustrated to include font data 112. The font data 112 describes font files of a variety of fonts that are usable to render glyphs of editable text. These font files include OpenType font files, TrueType font files, FNT files, and so forth. In some examples, each font file described by the font data 112 includes a Compact Font Format (CFF) table, a Glyph Data (glyf) table, an OS/2 table, a Character to Glyph Index Mapping (cmap) table, etc. As shown, the font data 112 includes glyphs of editable text 114 which are displayable in a user interface 116 of the display device 106. For example, the glyphs of editable text 114 are rendered using a font file of a particular font and the font data 112 describes font files of a multitude of different fonts.

The snap guide module 110 is illustrated as having, receiving, and/or transmitting input data 118. The input data 118 describes user interactions with an input device such as a stylus, a mouse, a keyboard, a microphone, etc. For example, a user interacts with the input device to generate the input data 118 which is received by the computing device 102 and/or the snap guide module 110. The computing device 102 and/or the snap guide module 110 processes the input data 118 to correlate interactions with the input device described by the input data 118 with a user interface element displayed in the user interface 116 such as a cursor 120.

The snap guide module 110 processes the font data 112 to render the glyphs of editable text 114 in the user interface 116 as enhanced glyphs of editable text 122. To do so, the snap guide module 110 accesses the font file associated with the particular font used to render the glyphs of editable text 114 and uses outline data included in the font file to enclose the glyphs of editable text 114 within a bounding box. For instance, the bounding box has a height that is less than a height of an em-box of the particular font. The snap guide module 110 uses the bounding box and the font file of the particular font to generate snap guides 124-128 which are included in the user interface 116 of the display device 106 relative to the enhanced glyphs of editable text 122.

As shown, the snap guide module 110 generates snap guide 124 for a top side of the bounding box, snap guide 126 for an x-height of the particular font, and snap guide 128 for a baseline of the particular font. The snap guide 124 includes a snap guide label 130 "glyphbound" which indicates that the snap guide 124 is for a side of the bounding box. The snap guide 126 includes a snap guide label 132 "x-height" to indicate that the snap guide 126 is for the x-height of the particular font, and the snap guide 128 includes a snap guide label 134 "baseline" which indicates that the snap guide 128 is for the baseline of the particular font.

In some examples, the snap guide module 110 displays the snap guide labels 130-134 in the user interface 116 such that no portion of the snap guide labels 130-134 intersects or overlaps the glyphs of editable text 114. For instance, the snap guide module 110 displays the snap guide label 130 as being adjacent to an end of the snap guide 124 based on the position of the cursor 120 in the user interface 116. For example, the snap guide module 110 displays the snap guide label 130 as being adjacent to an end of the snap guide 124 that is furthest from the position of the cursor 120 in the user interface 116.

Consider an example in which the input data 118 describes a current position of the cursor 120 in the user interface 116 as being closer to a first end of the snap guide 124 than a second end of the snap guide 124. In this example, the snap guide module 110 displays the snap guide label 130 as being adjacent to the second end of the snap guide 124. Continuing this example, a user interacts with the input device to move the cursor 120 to a new current position in the user interface 116. The snap guide module 110 receives updated input data 118 describing the new current position of the cursor 120 as being closer to the second end of the snap guide 124 than the first end of the snap guide 124. In response to receiving the updated input data 118, the snap guide module 110 displays the snap guide label 130 as being adjacent to the first end of the snap guide 124.

For example, the snap guides 124-128 are included in a first group of snap guides and the snap guide module 110 also generates a second group of snap guides for the enhanced glyphs of editable text 122. To do so in one example, the snap guide module 110 processes the font data 112 to access the font file associated with the particular font used to render the glyphs of editable text 114 and combines a bounding box of an uppercase glyph and a lowercase glyph of the particular font. The snap guide module 110 determines an ascender and a descender of the particular font based on the combined bounding box and divides the bounding box containing the glyphs of editable text 114 into visual regions based on the ascender, the descender, and the x-height of the particular font.

The snap guide module 110 generates candidate snap guides for the second group of snap guides based on portions of the glyphs of editable text 114 included in the visual regions. In one example, the snap guide module 110 generates the candidate snap guides based on maximum and minimum visual lines corresponding to the portions of the glyphs of editable text 114 in each of the visual regions. For instance, the snap guide module 110 identifies one snap guide of the candidate snap guides for each visual region to include in the second group of snap guides. In one example, the snap guide module 110 identifies the one snap guide as a snap guide that has a greatest area of intersection with the glyphs of editable text 114. For example, each of the candidate snap guides intersects the glyphs of editable text 114 and the snap guide module 110 determines the one snap guide as having the greatest area of intersection with the glyphs of editable text 114.

The second group of snap guides includes a first snap guide associated with the snap guide 124, a second snap guide associated with the snap guide 126, and a third snap guide associated with the snap guide 128. The snap guide module 110 displays the snap guides included in the second group of snap guides based on the position of the cursor 120 in the user interface 116. For example, if the snap guide module 110 determines that the position of the cursor 120 is within a threshold proximity of the first snap guide associated with the snap guide 124, then the snap guide module 110 displays the first snap guide in the user interface 116 relative to the enhanced glyphs of editable text 122. If the snap guide module 110 determines that the position of the cursor 120 is not within the threshold proximity of the first snap guide in the user interface 116, then the snap guide module 110 does not display the first snap guide in the user interface 116.

Figure 2:
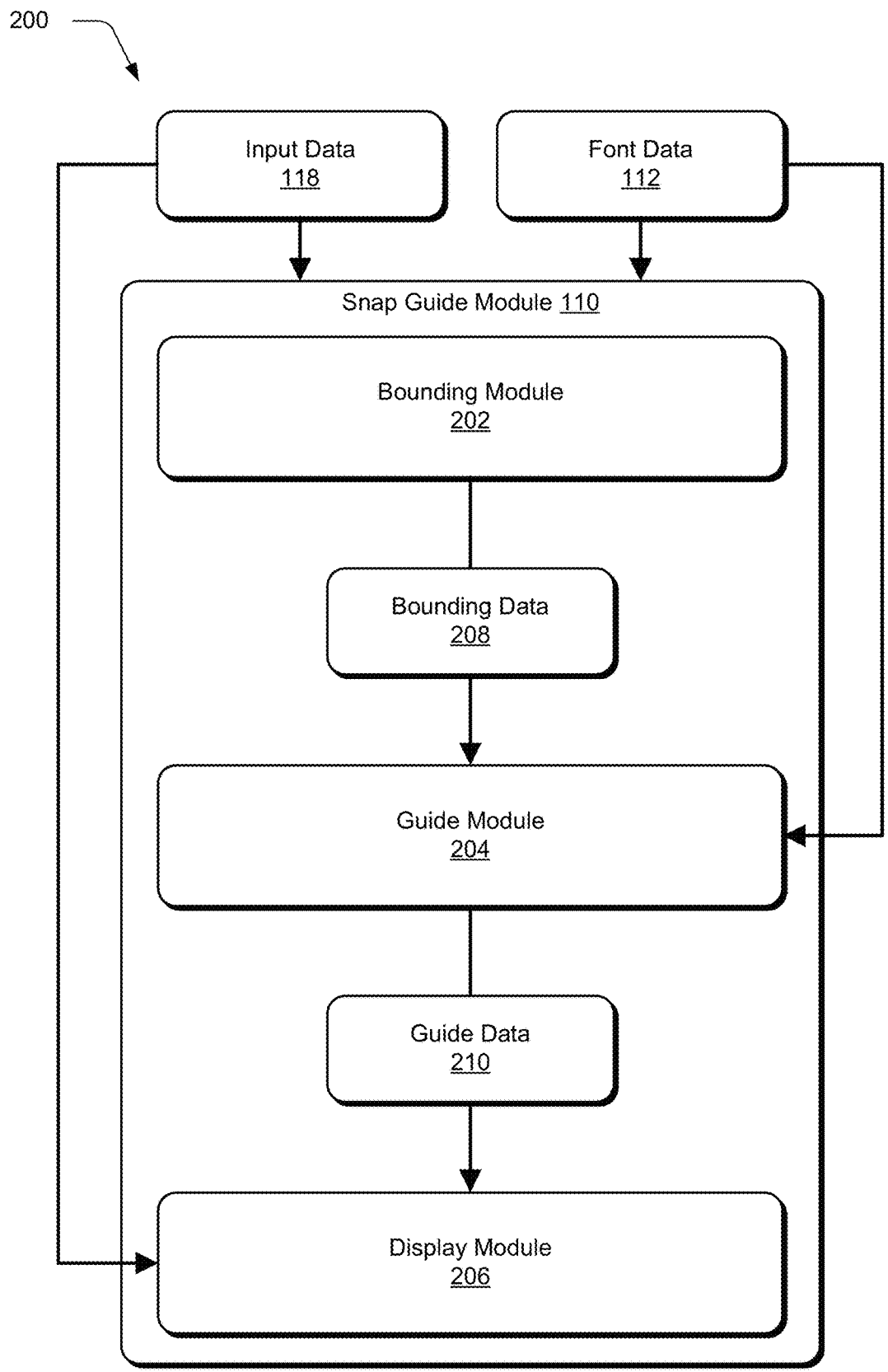
FIG. 2 depicts a system in an example implementation showing operation of a snap guide module for generating snap guides relative to glyphs of editable text.

FIG. 2 depicts a system 200 in an example implementation showing operation of a snap guide module 110. The snap guide module 110 is illustrated to include a bounding module 202, a guide module 204, and a display module 206. In one example, the snap guide module 110 receives the input data 118 and/or the font data 112 as inputs. In the illustrated example, the bounding module 202 receives the input data 118 and the font data 112 and processes the input data 118 and/or the font data 112 to generate bounding data 208.

Figure 3A:
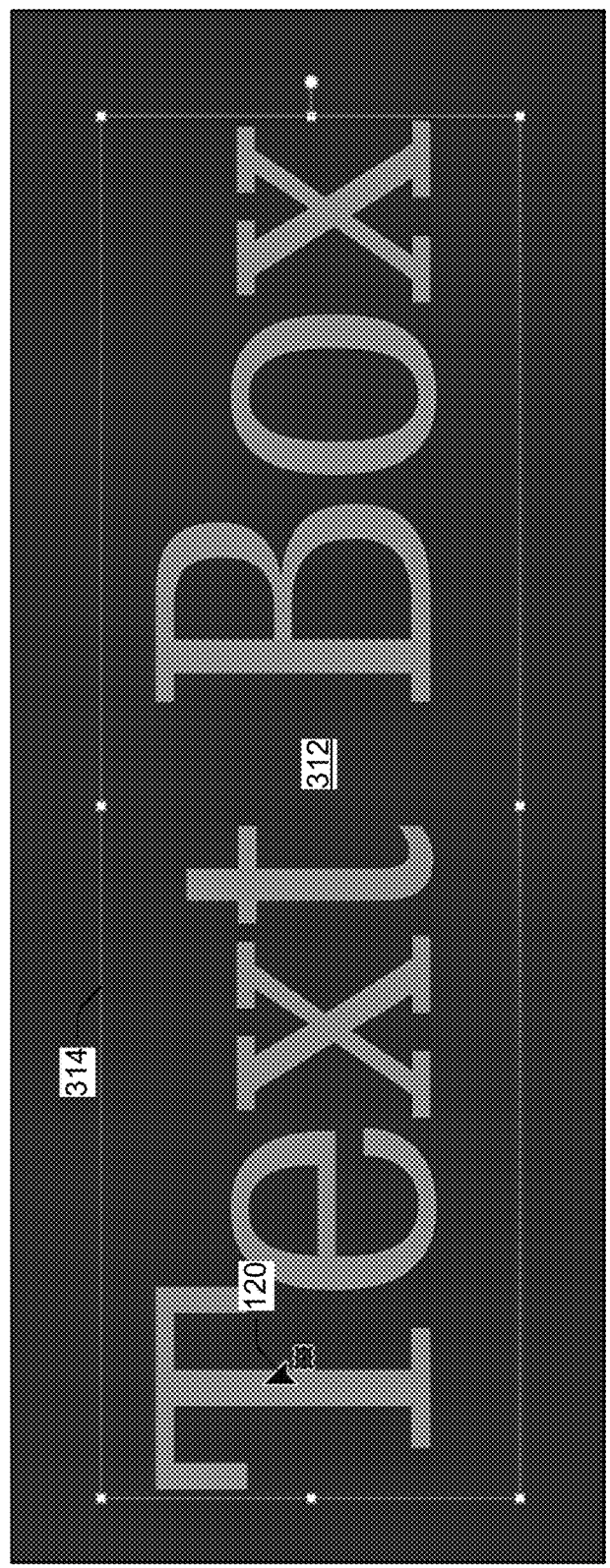
Figure 3B:
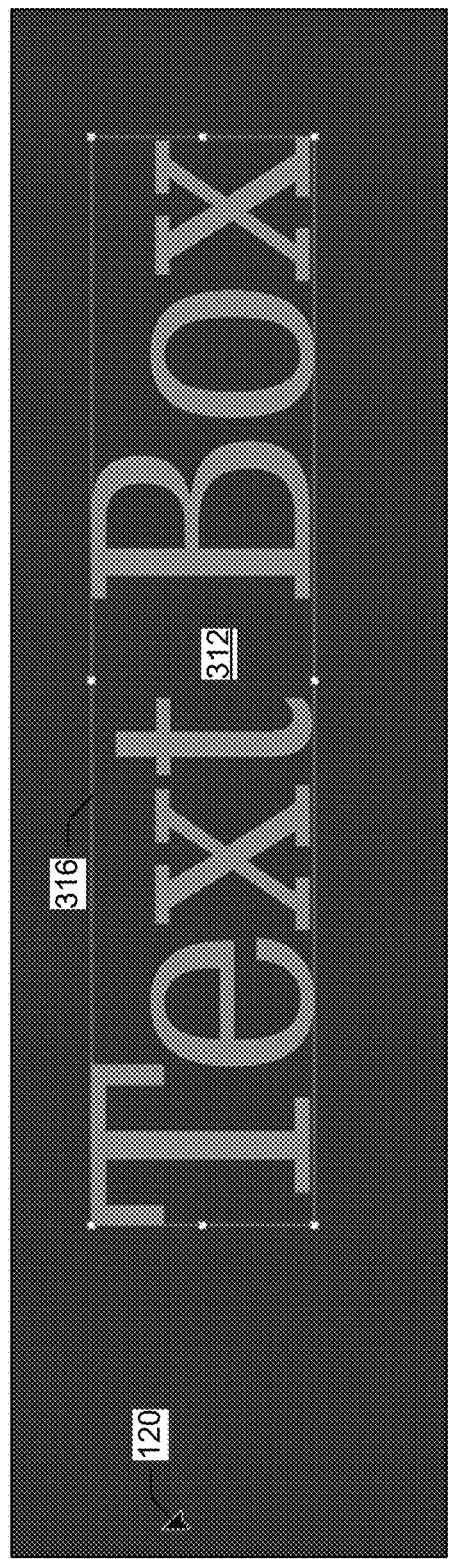
Figure 3C:
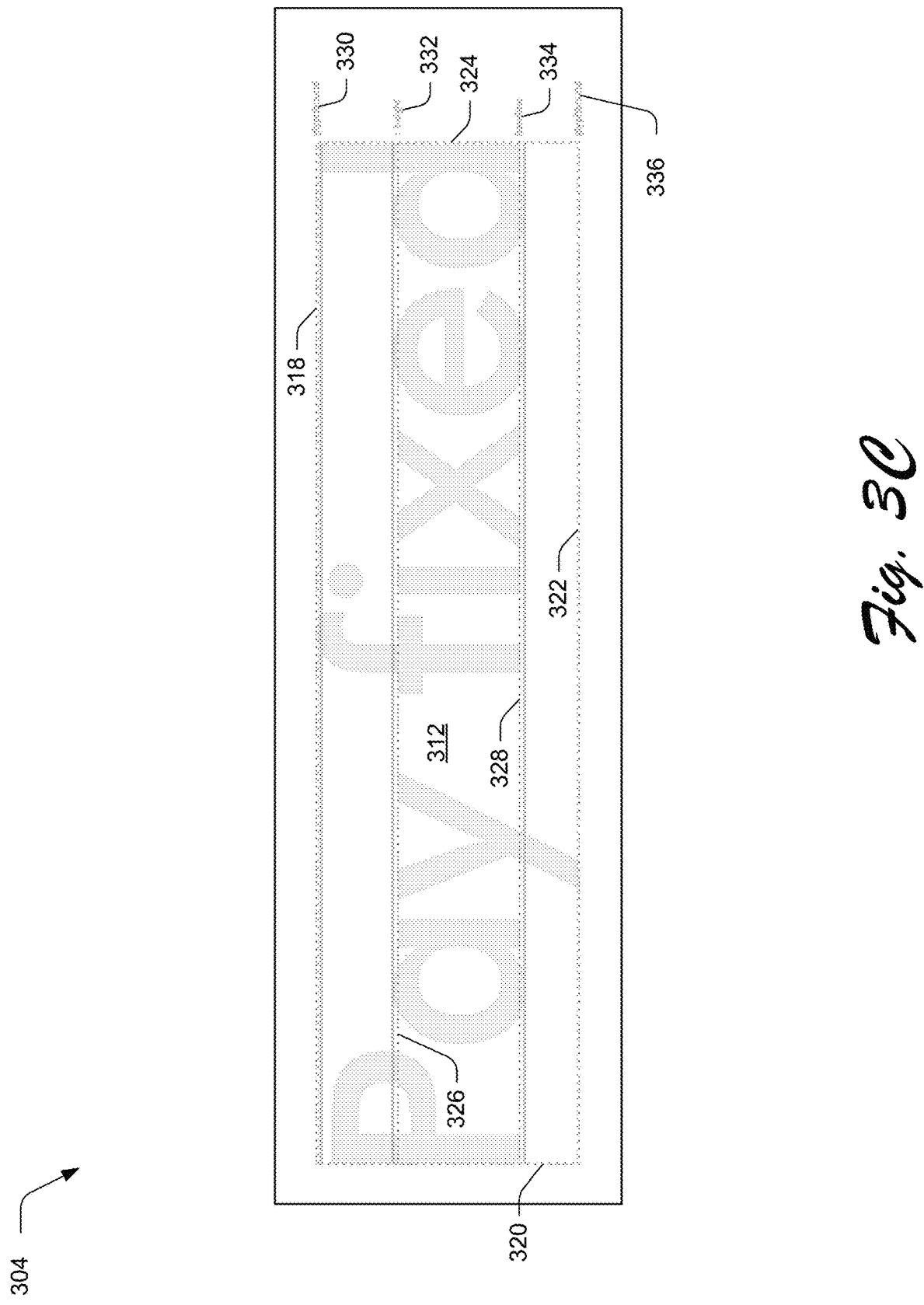
Figure 3D:
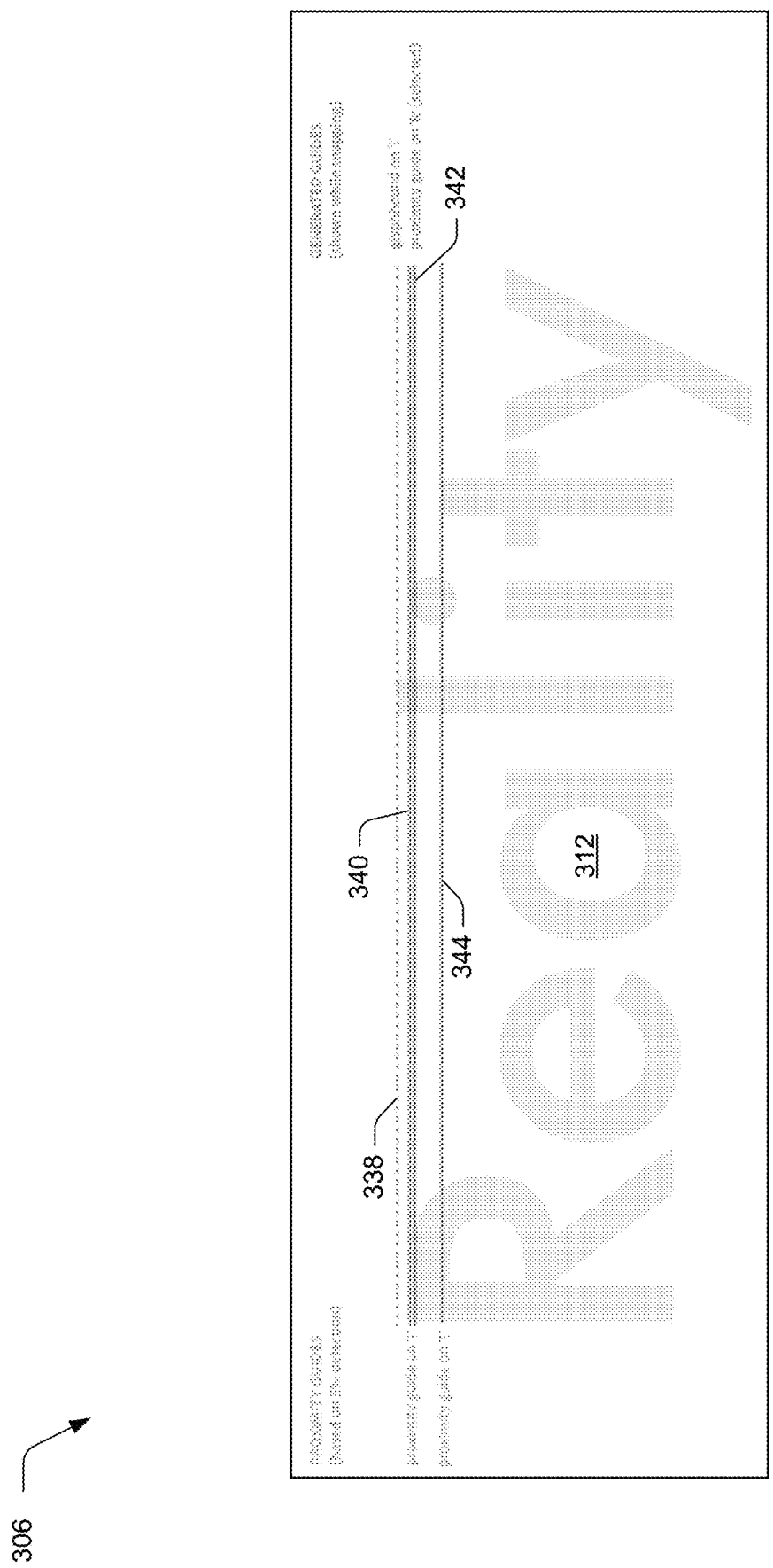
Figure 3E:
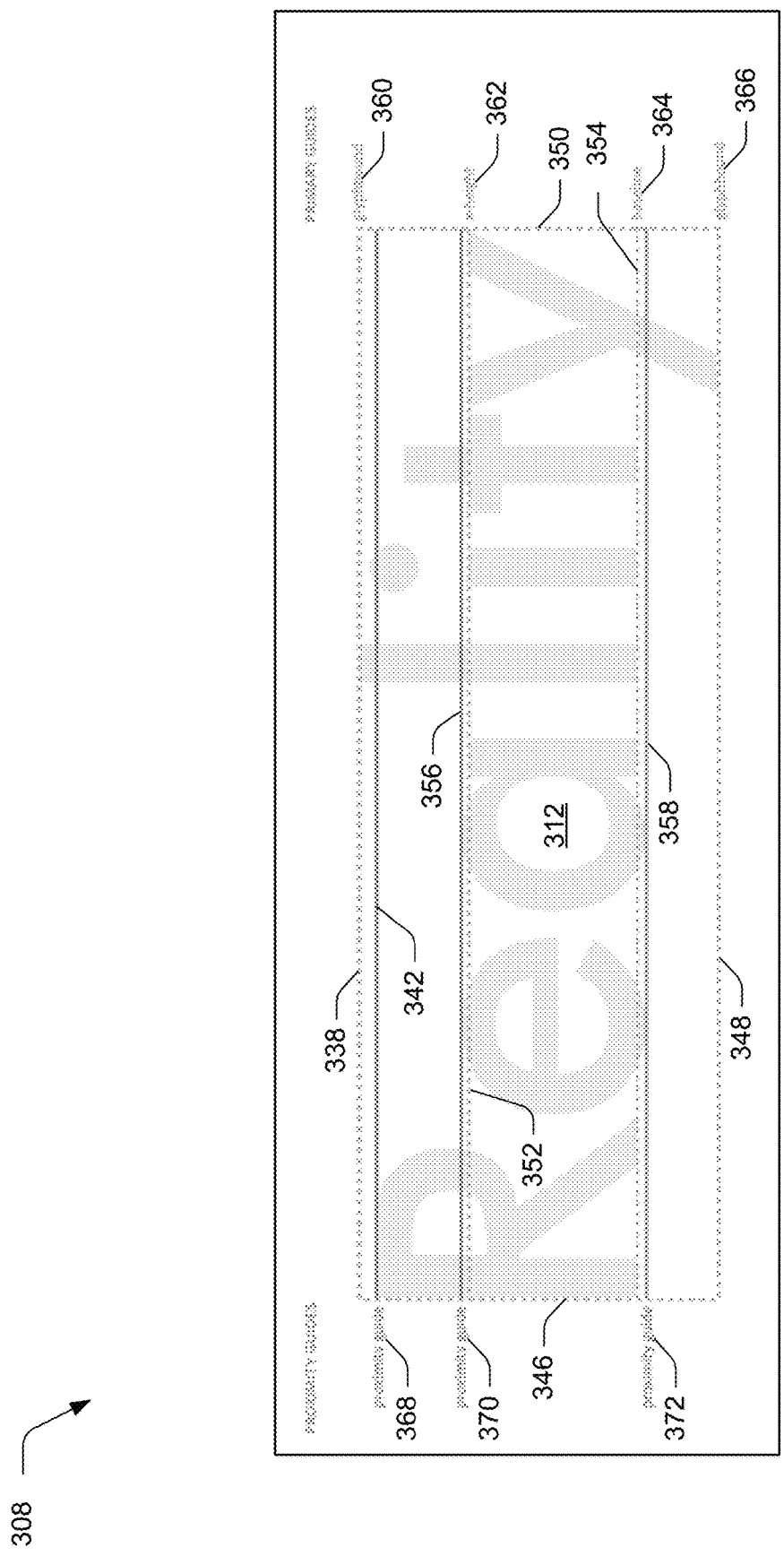
Figure 37:
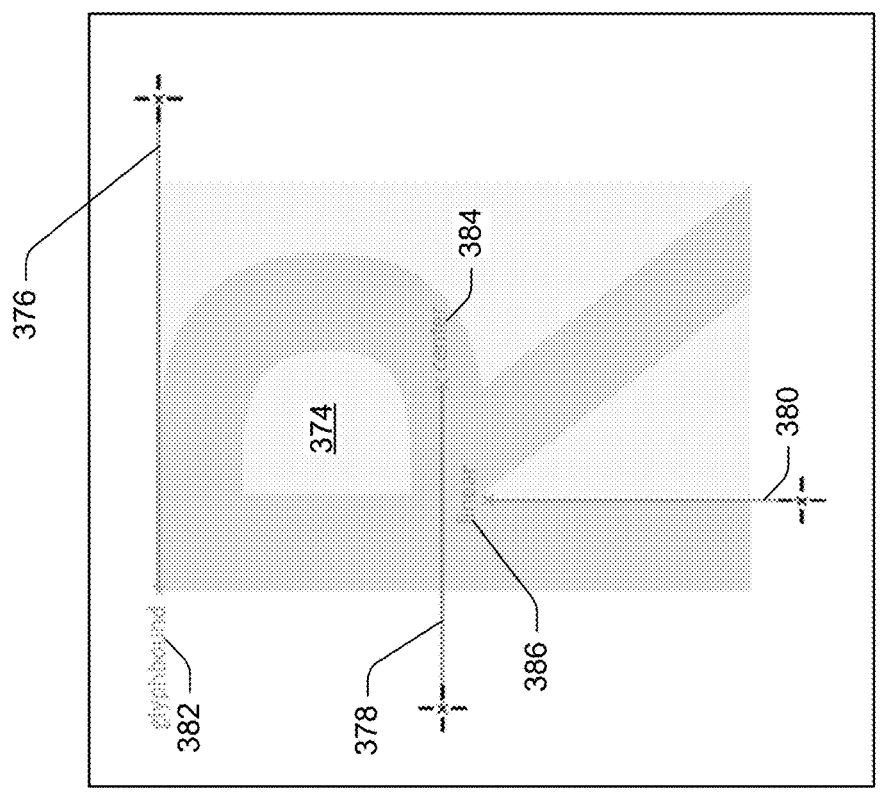

FIGS. 3A, 3B, 3C, 3D, 3E, and 3F illustrate examples of generating snap guides relative to glyphs of editable text. FIG. 3A illustrates a representation 300 of glyphs of editable text. FIG. 3B illustrates a representation 302 of the glyphs of editable text enclosed in a bounding box having a height that is less than a height of an em-box of a font used to render the glyphs of editable text. FIG. 3C illustrates a representation 304 of a first group of snap guides for the glyphs of editable text. FIG. 3D illustrates a representation 306 of generating candidate snap guides for inclusion in a second group of snap guides. FIG. 3E illustrates a representation 308 of generated snap guides for the glyphs of editable text. FIG. 3F illustrates a representation 310 of generated snap guides for a single glyph of editable text.

With reference to FIG. 2 and FIG. 3A, the representation 300 includes glyphs of editable text 312 rendered in a user interface using a font. In the illustrated example, the glyphs of editable text 312 are rendered as "Text Box" in the user interface using the font. For example, the font data 112 describes the glyphs of editable text 312 and the bounding module 202 receives the font data 112. The representation 300 also includes a cursor 120 which is rendered in the user interface relative to the glyphs of editable text 312. For instance, a user manipulates the cursor 120 in the user interface by interacting with an input device such as a mouse, a stylus, a keyboard, a touchscreen, and so forth. The input device generates the input data 118 which describes a position of the cursor 120 in the user interface and the bounding module 202 also receives the input data 118 in the illustrated example.

As shown, the representation 300 includes a bounding box 314 for the glyphs of editable text 312. The bounding box 314 has a height that is equal to or greater than a height of an em-box of the font used to render the glyphs of editable text 312. The bounding box 314 encloses the glyphs of editable text 312; however, the bounding box 314 includes space between extreme portions of the glyphs of editable text 312 and sides of the bounding box 314. For example, no portion of the glyphs of editable text 312 contacts or abuts any of the sides of the bounding box 314.

With reference to FIG. 2 and FIG. 3B, the bounding module 202 processes the font data 112 and identifies a font file for the font used to render the glyphs of editable text 312. For example, the bounding module 202 uses outline information included in the font file to generate a bounding box 316 having a height that is less than the height of the em-box of the font. The bounding module 202 encloses the glyphs of editable text 312 within the bounding box 316. As illustrated, the bounding box 316 has sides that contact or abut the extreme portions of the glyphs of editable text 312. A top side of the bounding box 316 contacts a portion of the glyph "T" as well as a portion of the glyph "B;" a right side of the bounding box 316 contacts a portion of the glyph "x;" a bottom side of the bounding box 316 contacts a portion of the glyph "e" and also contacts a portion of the glyph "o;" and a left side of the bounding box 316 contacts another portion of the glyph "T."

The bounding module 202 generates the bounding data 208 as describing the bounding box 316, and the guide module 204 receives the bounding data 208 and the font data 112. For example, the guide module 204 processes the bounding data 208 and/or the font data 112 to generate guide data 210. To do so, the guide module 204 generates a first group of snap guides for glyphs of editable text 312 that includes snap guides 318-324 for the sides of the bounding box 316. As illustrated in FIG. 3C, the glyphs of editable text 312 are rendered as "Pay fixed" in a user interface using a font and the bounding box 316 encloses the glyphs of editable text 312.

A bottom side of the bounding box 316 contacts a portion of the glyph "y." Similarly, a left side of the bounding box 316 contacts a portion of the glyph "P" and a right side of the bounding box 316 contacts a portion of the glyph "d." The guide module 204 generates a snap guide 318 for a top side of the bounding box 316; a snap guide 320 for the left side of the bounding box 316; a snap guide 322 for the bottom side of the bounding box 316; and a snap guide 324 for the right side of the bounding box 316.

For instance, the guide module 204 processes the font data 112 and accesses a font file of the font used to render the glyphs of editable text 312 to determine an x-height and a baseline of the font. The guide module 204 then generates additional snap guides for the first group of snap guides including a snap guide 326 for the x-height of the font and a snap guide 328 for the baseline of the font. For example, the first group of snap guides includes snap guides 318-328 and the guide module 204 generates snap guide labels for the first group of snap guides. The guide module 204 generates a snap guide label 330 "glyphbound" for the snap guide 318; a snap guide label 332 "x-height" for the snap guide 326; a snap guide label 334 "baseline" for the snap guide 328; and a snap guide label 336 "glyphbound" for the snap guide 322. As shown, the snap guide labels 330, 336 indicate that the snap guides 318, 322 are for the top and the bottom of the bounding box 316, respectively. The snap guide label 332 indicates that the snap guide 326 is for the x-height of the font and the snap guide label 334 indicates that the snap guide 328 is for the baseline of the font.

The guide module 204 also generates a second group of snap guides for the glyphs of editable text 312. To do so in one example, the guide module 204 divides the bounding box 316 into visual regions and generates candidate snap guides for each of the visual regions. In one example, the guide module 204 defines the visual regions based on the snap guides 318-328 included in the first group of snap guides and a distance threshold. In this example, the distance threshold is a percentage of a height of the bounding box 316 such as about 5 percent of the height of the bounding box 316. In other examples, the distance threshold is less than 5 percent or greater than 5 percent of the height of the bounding box 316. For example, the distance threshold is static (e.g., based on visual features of multiple different fonts) or the distance threshold is dynamic (e.g., based on visual features of the font used to render the glyphs of editable text 312).

In another example, the guide module 204 leverages the font data 112 to combine a bounding box of an uppercase and a lowercase glyph included in the glyphs of editable text 312. For example, the guide module 204 determines an ascender and a descender of the font used to render the glyphs of editable text 312 based on the combined bounding box of the uppercase and lowercase glyphs. The guide module 204 then defines the visual regions based on the ascender, the descender, and the x-height of the font. In one example, this is representable as:

$$t_1 = \left[asc, \frac{(asc - xheight)}{2}\right] t_2 = \left[lower(t_1), \frac{xheight}{2}\right]$$

$$t_3 = \left[lower(t_2), \frac{desc}{2}\right] t_4 = [lower(t_3), desc]$$

$$t_{asc} = (max_{vr} - min_{vr}) \text{ in range } t_1$$

$$t_{desc} = (max_{vr} - min_{vr}) \text{ in range } t_2$$

$$t_{xheight} = (max_{vr} - min_{vr}) \text{ in range } t_3$$

$$t_{baseline} = (max_{vr} - min_{vr}) \text{ in range } t_4$$

where: asc is the ascender of the font; xheight is the x-height of the font; desc is the descender of the font; $max_{vr}$ is a maximum visual region of glyphs of the font; $min_{vr}$ is a minimum visual region of glyphs of the font; and $t_1$, $t_2$, $t_3$, and $t_4$ are the visual regions of the bounding box 316.

The guide module 204 generates candidate snap guides for extreme portions (e.g., maximum and/or minimum visual regions) of the glyphs of editable text 312 included in each of the visual regions. For instance, the guide module 204 selects one candidate snap guide to include in the second group of snap guides for each of the visual regions. In one example, the guide module 204 selects the one candidate snap guide to include in the second group of snap guides per visual region to minimize "clutter" in the user interface. In other examples, the guide module 204 selects more than one candidate snap guide to include in the second group of snap guides for each of the visual regions.

For example, the guide module 204 does not generate a candidate snap guide for an extreme portion of a glyph within a visual region which corresponds to a snap guide included in the first group of snap guides. If a particular visual region does not contain an extreme portion of a glyph or if the particular visual region only includes an extreme portion of a glyph that corresponds to a snap guide included in the first group of snap guides, then the guide module 204 does not generate a candidate snap guide for the particular visual region. An example of multiple candidate snap guides generated in a visual region is illustrated in FIG. 3D. As shown, the representation 306 includes glyphs of editable text 312 rendered in a user interface using a font. The glyphs of editable text 312 are rendered as "Reality" in this example.

The glyphs of editable text 312 are enclosed within the bounding box 316 and a snap guide 338 is included for the top side of the bounding box 316. The guide module 204 has generated three candidate snap guides 340-344 for one of the visual regions, e.g., visual region $t_1$. Each of the three candidate snap guides 340-344 is associated with an extreme portion of particular glyph included in the glyphs of editable text 312. For example, snap guide 340 is associated with glyph "i;" snap guide 342 is associated with glyph "R;" and snap guide 344 is associated with glyph "t." The guide module 204 does not generate a candidate snap guide for the extreme portion of the glyph "l" because this extreme portion corresponds to the snap guide 338 which is included in the first group of snap guides.

In one example, the guide module 204 determines which of the candidate snap guides 340-344 has a greatest area of intersection with the glyphs of editable text 312 and includes the determined snap guide in the second group of snap guides. For example, the determined snap guide passes through a cumulative maximum width of the glyphs of editable text 312. The guide module 204 identifies the snap guide 342 as having the greatest area of intersection with the glyphs of editable text 312, and the guide module 204 includes the snap guide 342 in the second group of snap guides.

The guide module 204 also determines a snap guide to include in the second group of snap guides for visual regions $t_2$ and $t_3$. However, visual region $t_4$ only includes an extreme portion of glyph "y" and that extreme portion corresponds to a snap guide included in the first group of snap guides. FIG. 3E illustrates snap guides included in the first and second groups of snap guides. The representation 308 includes glyphs of editable text 312 rendered using a font. In this example, the glyphs of editable text 312 are enclosed in the bounding box 316 and are rendered as "Reality" as in the user interface.

The first group of snap guides includes the snap guide 338 as well as snap guides 346-354. In an example, the guide module 204 generates the snap guide 338 for the top of the bounding box 316. In this example, the guide module 204 also generates snap guide 346 for a left side of the bounding box 316; snap guide 348 for a bottom side of the bounding box 316; snap guide 350 for a right side of the bounding box 316; snap guide 352 for an x-height of the font; and snap guide 354 for a baseline of the font. The second group of snap guides includes the snap guide 342 and also includes snap guides 356, 358. As shown, the guide module 204 generates the snap guide 342 for an extreme portion of the glyph "R." The guide module 204 generates the snap guide 356 for a first extreme portion of glyphs "e" and "a" and generates the snap guide 358 for a second extreme portion of the glyphs "e" and "a."

The guide module 204 generates snap guide labels for the snap guides included in the first group of snap guides and the snap guides included in the second group of snap guides. For example, the guide module 204 generates a snap guide label 360 "glyphbound" for the snap guide 338 which indicates the snap guide 338 is for a side of the bounding box 316; a snap guide label 362 "x-height" for the snap guide 352 which indicates the snap guide 352 is for an "x-height" of the font used to render the glyphs of editable text 312; a snap guide label 364 "baseline" for the snap guide 354 which indicates the snap guide 354 is for a baseline of the font used to render the glyphs of editable text 312; and a snap guide label 366 "glyphbound" for the snap guide 348 which indicates the snap guide 348 is also for a side of the bounding box 316. For example, the snap guide label 360 indicates that the snap guide 338 is a member of the first group of snap guides. The guide module 204 generates a snap guide label 368 "proximity guide" for the snap guide 342 which indicates that the snap guide 342 is included in the second group of snap guides; a snap guide label 370 "proximity guide" for the snap guide 356 which indicates that the snap guide 356 is included in the second group of snap guides; and a snap guide label 372 "proximity guide" for the snap guide 358 which indicates that the snap guide 358 is also included in the second group of snap guides.

In addition to generating the snap guides 338, 342, 346-358 relative to the glyphs of editable text 312, the guide module 204 is also capable of generating snap guides relative to a single glyph of editable text and/or portions of multiple glyphs joined as a single glyph such as a ligature. With reference to FIG. 3F, the representation 310 includes a single glyph of editable text 374 rendered in a user interface using a font. The single glyph of editable text 374 is glyph "R" in the illustrated example. For example, the guide module 204 determines the font used to render the single glyph of editable text 374 and processes the font data 112 to access a font file of the determined font.

This font file includes an outline and a bounding box of the single glyph of editable text 374, and the guide module 204 leverages the outline and the bounding box to generate a snap guide 376 for a side of the bounding box of the single glyph of editable text 374. The guide module 204 also uses the outline and/or the bounding box to generate a snap guide 378 for a vertical center of the single glyph of editable text 374 and a snap guide 380 for a linear portion of the outline of the single glyph of editable text 374. As shown, the guide module generates a snap guide label 382 "glyphbound" for the snap guide 376 which indicates that the snap guide 376 is for the side of the bounding box of the single glyph of editable text 374; a snap guide label 384 "center" for the snap guide 378 which indicates that the snap guide 378 is for the vertical center of the single glyph of editable text 374; and a snap guide label 386 "linear" for the snap guide 380 which indicates that the snap guide 380 is for the linear portion of the outline of the single glyph of editable text 374.

Figure 4B:
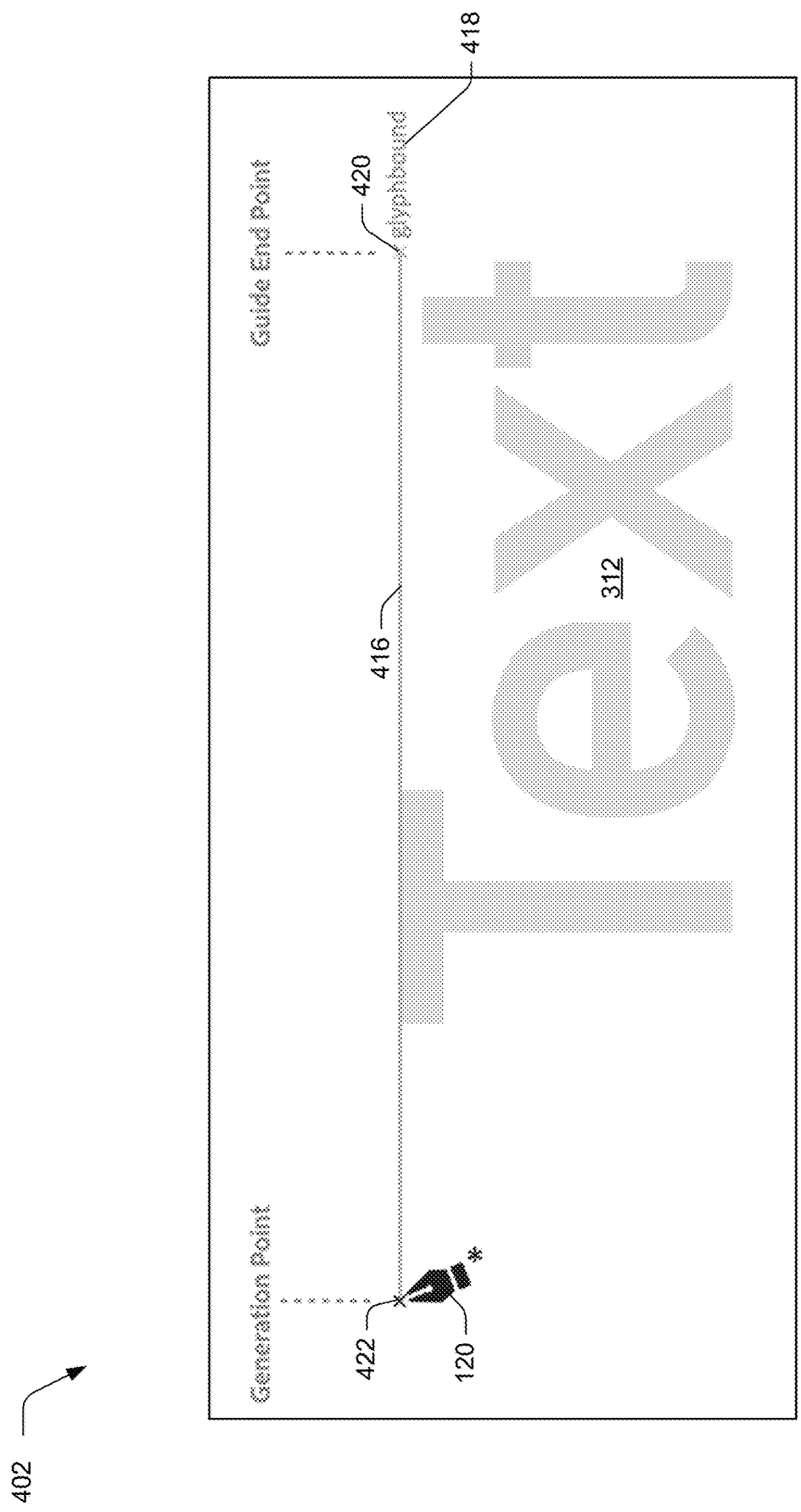
FIGS. 4A, 4B, 4C, 4D, 4E, and 4F illustrate examples of information describing generated snap guides.
Figure 4E:
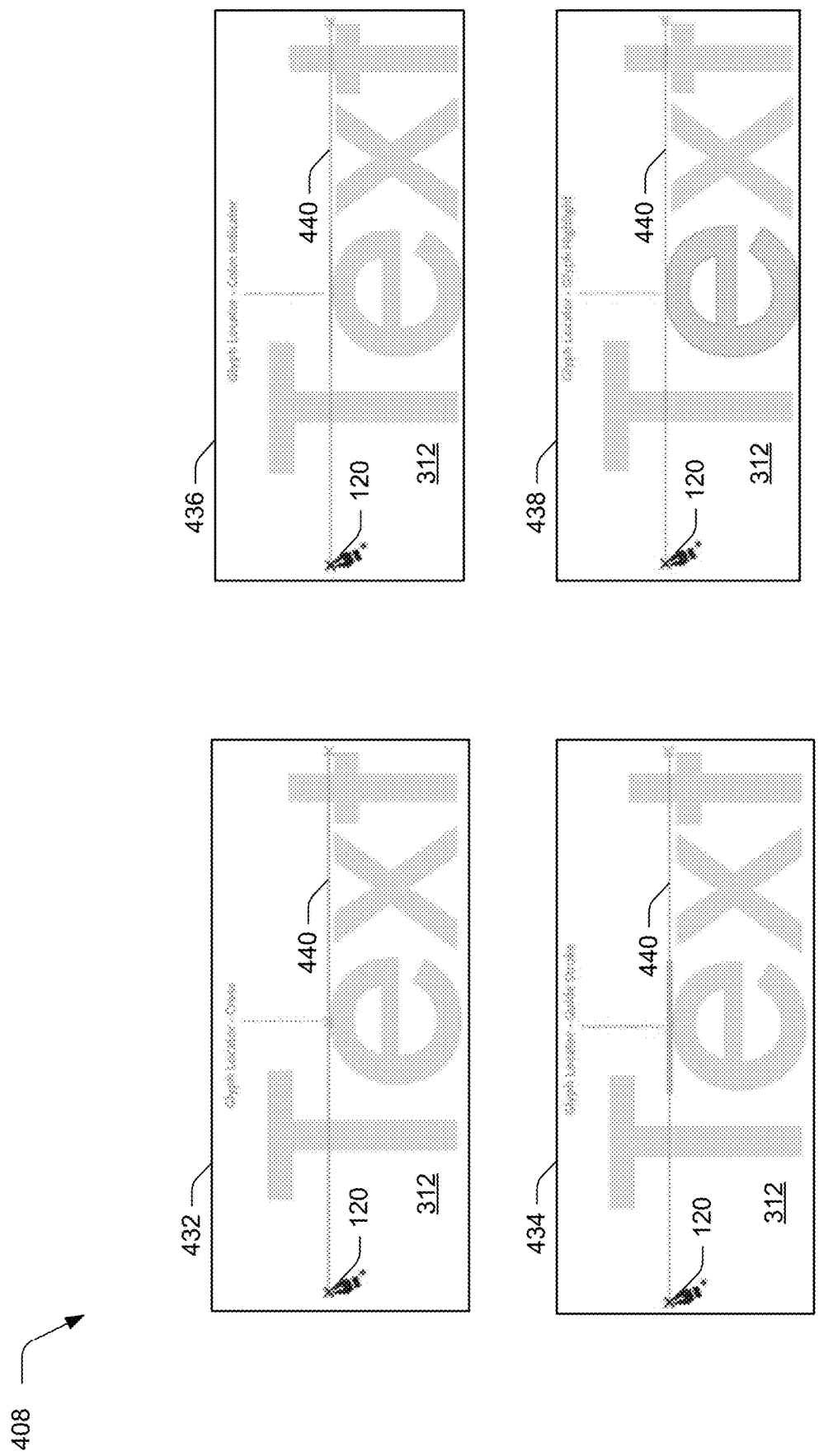
Figure 4J:
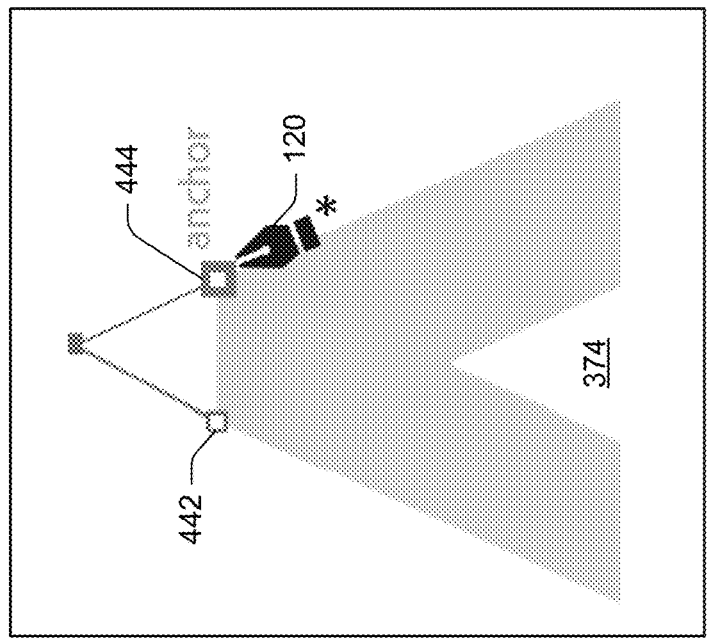

FIGS. 4A, 4B, 4C, 4D, 4E, and 4F illustrate examples of information describing generated snap guides. FIG. 4A illustrates a representation 400 of defined positions for displaying snap guide labels. FIG. 4B illustrates a representation 402 of an indication of an origination of a snap guide with respect to glyphs of editable text. FIGS. 4C and 4D illustrate representations 404 and 406, respectively, of examples in which snap guide labels are displayed relative to originations of snap guides. FIG. 4E illustrates a representation 408 of examples of indications of a particular glyph and a snap guide that are generated based on a visual correspondence between the particular glyph and the snap guide. FIG. 4F illustrates a representation 410 of visual differentiations between a non-editable anchor point and an editable anchor point.

As shown in FIG. 4A, the guide module 204 defines positions for displaying snap guide labels in scenarios in which glyphs are rendered in first orientations 412 or in second orientations 414 in a user interface. The first orientations 412 are 90 degree orientations for glyphs rendered horizontally or vertically in the user interface. The second orientations 414 are rotated orientations for multiple glyphs rendered at an angle relative to the first orientations 412 or for angular segments of a single glyph rendered in the user interface.

As illustrated in the representation 400, snap guide labels are displayed at an end of a corresponding snap guide which is opposite from a nearest end of the corresponding snap guide to the cursor 120 in the user interface. For example, snap guide labels are displayed at an end of a corresponding snap guide that is a furthest distance from the cursor 120 in the user interface. In one example, snap guide labels are displayed two points above or below an end of a corresponding snap guide in the user interface. However, in other examples snap guide labels are displayed less than two points above or below an end of a corresponding snap guide or more than two points above or below the end of the corresponding snap guide in the user interface.

As illustrated in FIG. 4B, the representation 402 includes glyphs of editable text 312 rendered in a user interface using a font. A snap guide 416 is displayed in the user interface having a snap guide label 418 "glyphbound" which indicates that the snap guide 416 is for a top side of the bounding box 316 that encloses the glyphs of editable text 312. The snap guide label 418 is displayed adjacent to an end of the snap guide 416 that is furthest from the cursor 120 in the user interface. This end of the snap guide 416 includes an indication of a termination 420 of the snap guide 416. The snap guide 416 also includes an indication of an origination 422 of the snap guide 416. For example, the indication of the termination 420 and the indication of the origination 422 of the snap guide 416 provide context for a manner in which the snap guide 416 is displayed relative to the glyphs of editable text 312 in the user interface.

The representations 404 and 406 depicted in FIG. 4C and FIG. 4D, respectively, collectively include examples 424-430. In example 424, the cursor 120 is disposed on a left side of the glyphs of editable text 312 and a snap guide label "x-height" is displayed adjacent to a right end of a snap guide that is displayed relative to the glyphs of editable text 312. In example 426, the cursor 120 is disposed on a right side of the glyphs of editable text 312 and a snap guide label "x-height" is displayed adjacent to a left end of a snap guide that is displayed relative to the glyphs of editable text 312 in the user interface. In example 428, the cursor 120 is disposed on a top side of the glyphs of editable text 312 and a snap guide label "tightbound" is displayed adjacent to a bottom end of a snap guide that is displayed relative to the glyphs of editable text 312. Similarly, in example 430, the cursor 120 is disposed on a bottom side of the glyphs of editable text 312 and a snap guide label "tightbound" is displayed adjacent to a top end of a snap guide that is displayed relative to the glyphs of editable text 312 in the user interface.

As previously described with respect to FIG. 3D, the guide module 204 generates candidate snap guides for the second group of snap guides based on extreme portions of individual glyphs of the glyphs of editable text 312 included in the visual regions of the bounding box 316. In some examples, when the guide module 204 generates a candidate snap guide for an extreme portion of a specific glyph of the glyphs of editable text 312, the guide module 204 associates the candidate snap guide with a glyph identification of the specific glyph. In these examples, if the guide module 204 includes the candidate snap guide in the second group of snap guides, then the guide module 204 generates an indication of the specific glyph for display in the user interface based on the glyph identification of the specific glyph. For instance, there is a visual correspondence between the specific glyph and the candidate snap guide because the candidate snap guide is generated for the extreme portion of the specific glyph. FIG. 4E illustrates examples 432-438 of indications of a particular glyph and a snap guide generated based on an extreme portion of the particular glyph.

As shown in the representation 408, glyphs of editable text 312 are rendered in a user interface as "Text" and a snap guide 440 is generated for an extreme portion of glyph "e" of the glyphs of editable text 312. In example 432, the guide module 204 generates an indication of the glyph "e" as a cross shape which is displayed in the user interface as a portion of the snap guide 440. For example, the indication of the glyph "e" indicates that there is a visual correspondence between the glyph "e" and the snap guide 440. In this example, the indication of the glyph "e" visually communicates that the snap guide 440 is generated for an extreme portion of the glyph "e" rather than for an extreme portion of glyph "T," "x," or "t."

In examples 434 and 436, the guide module 204 generates the indication of the glyph "e" as a portion of the snap guide 440 which is visually distinguishable from other portions of the snap guide 440. In example 434, the portion of the snap guide 440 has a thickness which is visually distinguishable from a thickness of the other portions of the snap guide 440. In example 436, the portion of the snap guide 440 has a color which is visually distinguishable from a color or colors of the other portions of the snap guide 440.

In example 438, the guide module 204 generates the indication of the glyph "e" as a visual feature that distinguishes the glyph "e" from remaining glyphs "T," "x," and "t" of the glyphs of editable text 312. As shown, the visual feature is a highlighting of the glyph "e." In other examples, the visual feature is a color, a pattern, and so forth. For instance, the guide module 204 generates the indication of the glyph "e" such that the glyph "e" includes a visual feature that is not included in the remaining glyphs of editable text 312 or such that the glyph "e" does not include a visual feature that is included in the remaining glyphs of editable text 312.

The guide module 204 also visually distinguishes non-editable anchor points from editable anchor points displayed in the user interface. An example of this is illustrated in FIG. 4F. As shown, the representation 410 includes a single glyph of editable text 374 rendered in the user interface. The representation 410 also includes an editable anchor point 442 and a non-editable anchor point 444. The non-editable anchor point 444 is bolder than the editable anchor point 442 to visually distinguish between the non-editable anchor point 444 and the editable anchor point 442. For example, the non-editable anchor point 444 is colored differently than the editable anchor point 442 to further visually distinguish the non-editable anchor point 444 from the editable anchor point 442.

With reference to FIG. 2, the guide module 204 generates the guide data 210 as describing snap guides included in the first group of snap guides and snap guides included in the second group of snap guides. The guide module 204 also generates the guide data 210 as describing snap guide labels for the snap guides and indications of originations of the snap guides. For example, the guide module 204 generates the guide data 210 as describing manners in which the snap guide labels are displayed relative to corresponding snap guides.

In an example, the guide module 204 generates the guide data 210 as describing a protocol for displaying snap guides and snap guide labels relative to glyphs of editable text 312. For horizontal snap guides, the protocol specifies that when the cursor 120 is disposed on a left side of the glyphs of editable text 312, then snap guide labels are displayed on a right side of originations of corresponding horizontal snap guides. The protocol further specifies that for horizontal snap guides, when the cursor 120 is disposed on a right side of the glyphs of editable text 312, then snap guide labels are displayed on a left side of originations of corresponding horizontal snap guides. For horizontal snap guides when the cursor 120 intersects the horizontal snap guides in the user interface, the protocol specifies that snap guide labels are displayed adjacent to a furthest end of the horizontal snap guides from a position of the cursor 120 in the user interface.

For vertical snap guides, the protocol specifies that when the cursor 120 is above the glyphs of editable text 312, then snap guide labels are displayed below originations of corresponding vertical snap guides. The protocol also specifies that for vertical snap guides, when the cursor is below the glyphs of editable text 312, then snap guide labels are displayed on a left side of originations of corresponding vertical snap guides. For vertical snap guides when the cursor 120 intersects the vertical snap guides in the user interface, the protocol specifies that snap guide labels are displayed adjacent to a furthest end of the vertical snap guides from a position of the cursor 120 in the user interface.

As shown in FIG. 2, the display module 206 receives the guide data 210 that describes the snap guides included in the first group of snap guides, the snap guides included in the second group of snap guides, originations of the snap guides, labels for the snap guides, and the protocol for displaying the snap guides and the snap guide labels relative to the glyphs of editable text 312 based on a position of the cursor 120 in the user interface. The display module 206 also receives the input data 118 and the display module 206 processes the guide data 210 and/or the input data 118 to display snap guides and snap guide labels relative to the glyphs of editable text 312.

Figure 5A:
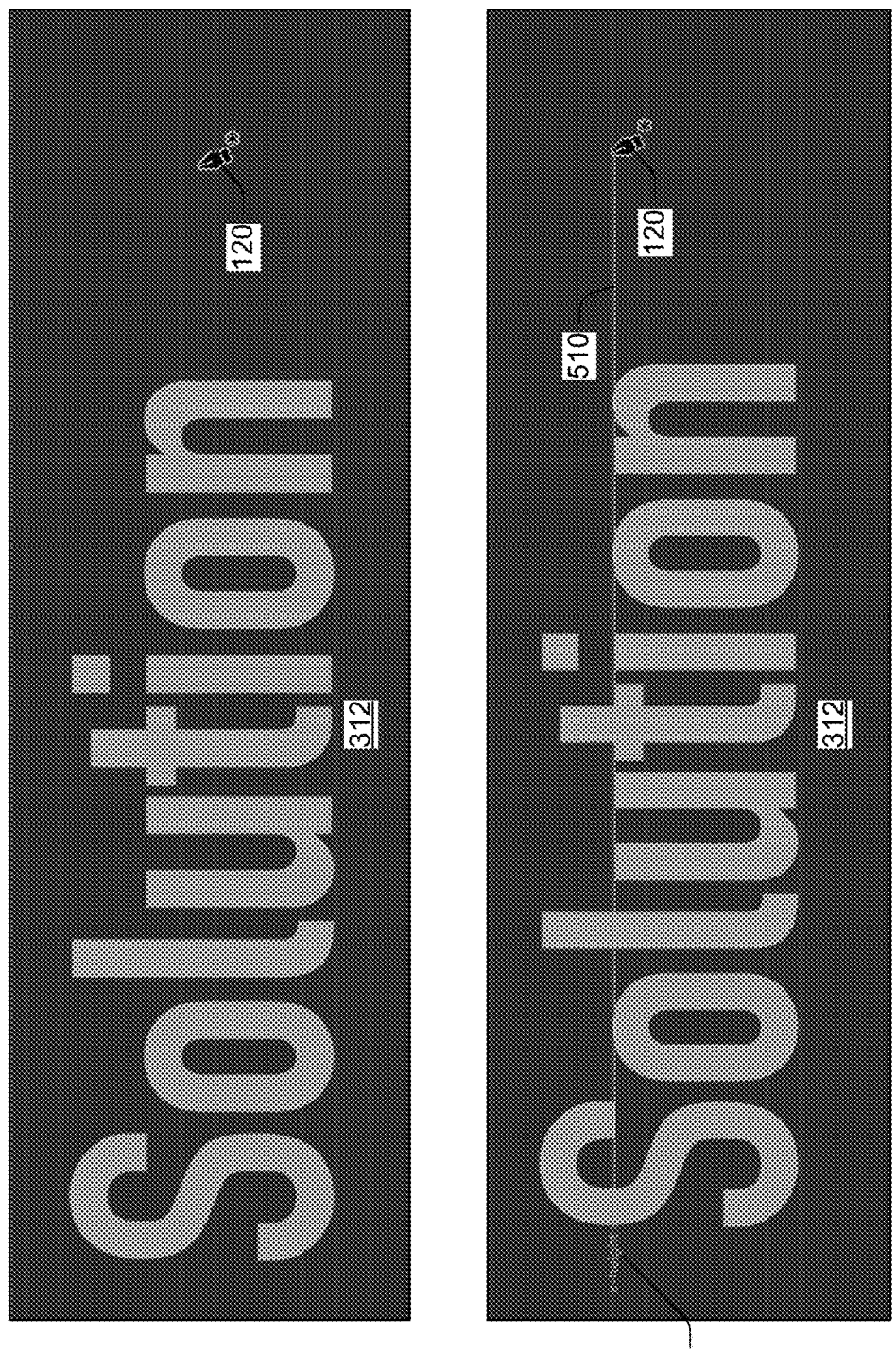
FIGS. 5A, 5B, 5C, 5D, and 5E illustrate examples of generating indications of snap guides in response to receiving input data describing user interactions with an input device.
Figure 5B:
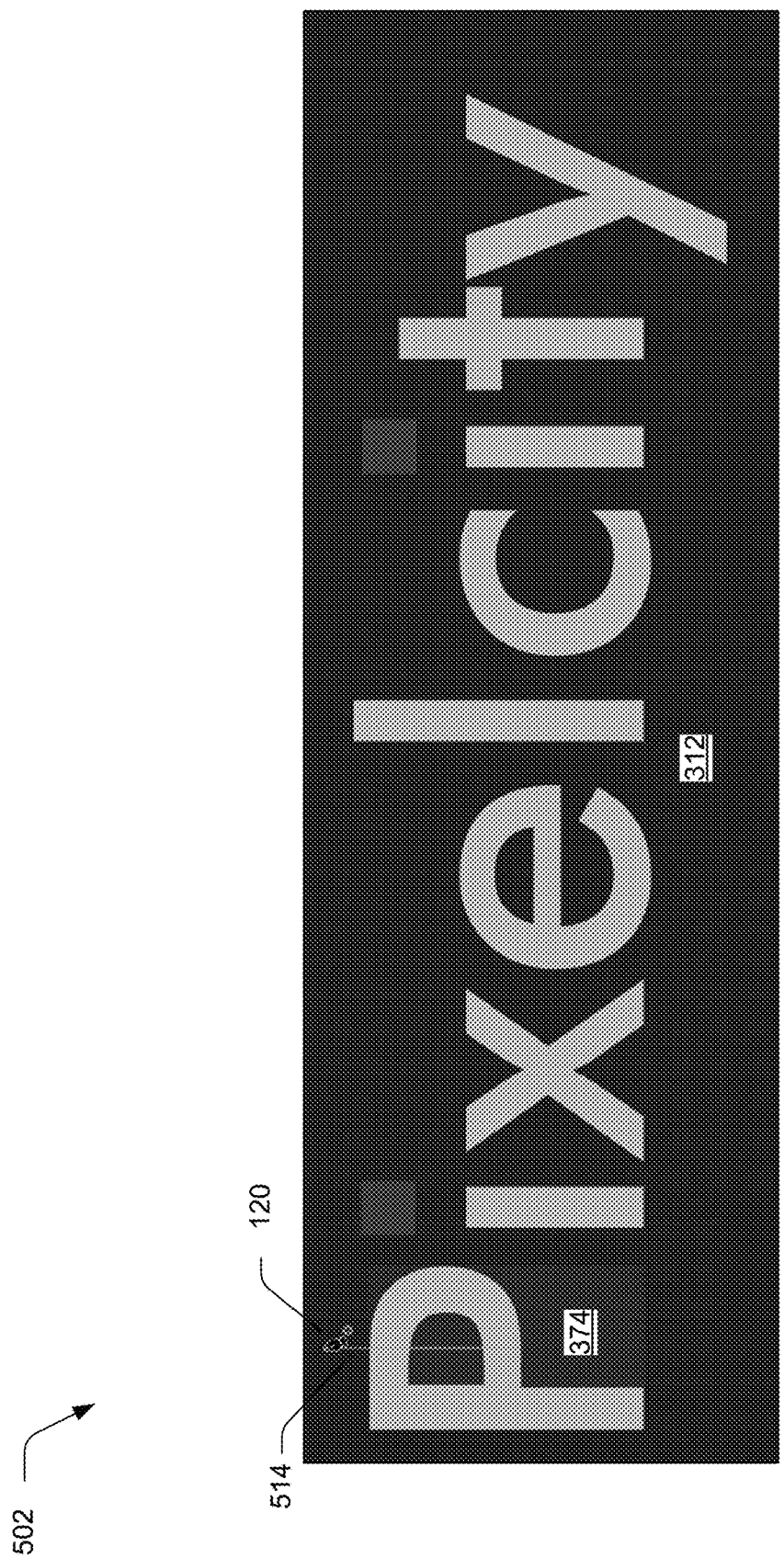
Figure 5S:
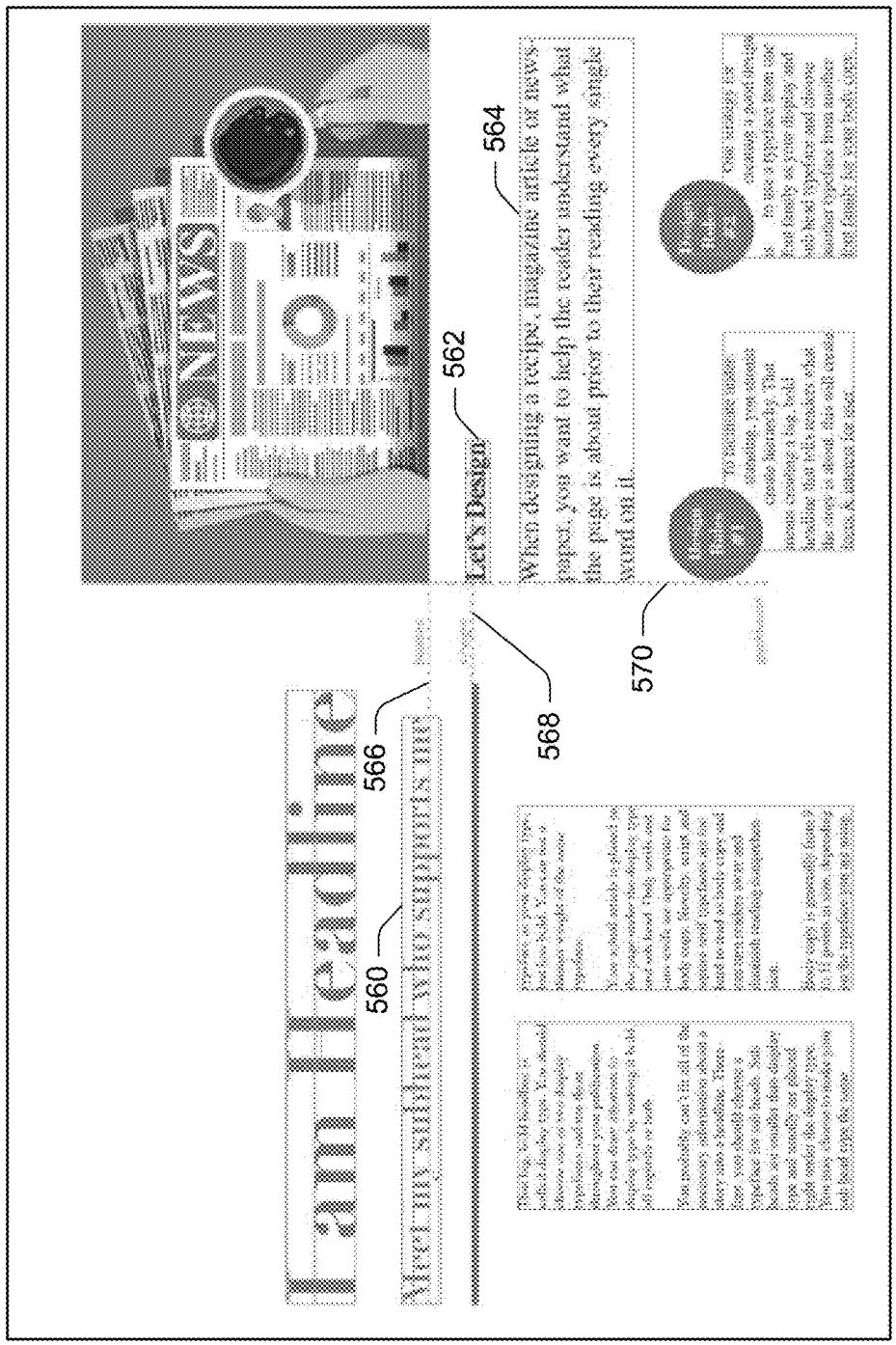

FIGS. 5A, 5B, 5C, 5D, and 5E illustrate examples of generating indications of snap guides in response to receiving input data describing user interactions with an input device. FIG. 5A illustrates a representation 500 of displaying a snap guide in a user interface in response to determining that a position of a cursor is within a threshold proximity of the snap guide in the user interface. FIG. 5B illustrates a representation 502 of displaying a snap guide relative to a single glyph of editable text. FIG. 5C illustrates a representation 504 of displaying snap guides for glyphs of editable text rotated relative to a 90 degree orientation in the user interface. FIG. 5D illustrates a representation 506 of displaying snap guides for glyphs of editable text in 90 degree orientations in the user interface. FIG. 5E illustrates a representation 508 of displaying snap guides relative to glyphs of editable text included in textboxes in the user interface.

As shown in FIG. 5A, the representation 500 includes glyphs of editable text 312 rendered in the user interface. For example, a user interacts with an input device (e.g., a mouse, a stylus, a touchscreen, etc.) to manipulate a cursor 120 in the user interface. In this example, the input device generates the input data 118 which describes a first position of the cursor 120 in the user interface (top). The display module 206 receives the input data 118 and processes the input data 118 and/or the guide data 210 to determine that the first position of the cursor 120 in the user interface is not within a threshold proximity of a snap guide generated for the glyphs of editable text 312. As a result of this, the display module 206 does not display an indication of a snap guide relative to the glyphs of editable text 312.

Continuing the previous example, the user interacts with the input device to manipulate the cursor 120 in the user interface and the input device generates the input data 118 which describes a second position of the cursor 120 in the user interface (bottom). The display module 206 receives the input data 118 and processes the input data 118 and/or the guide data 210 to determine that the second position of the cursor 120 in the user interface is within a threshold proximity of a snap guide for an x-height of the glyphs of editable text 312. The display module 206 generates and displays an indication 510 of the snap guide for the x-height which includes a snap guide label 512 "x-height." As shown, the snap guide label 512 is displayed adjacent to a furthest end of the indication 510 of the snap guide from the second position of the cursor 120 in the user interface.

As illustrated in FIG. 5B, the representation 502 includes glyphs of editable text 312 rendered in the user interface. For instance, the user interacts with the input device to manipulate the cursor 120 in the user interface and select a single glyph of editable text 374. The display module 206 receives the input data 118 which describes selection of the single glyph of editable text 374 and a position of the cursor 120 in the user interface. The display module 206 processes the input data 118 and/or the guide data 210 to determine that the position of the cursor 120 in the user interface is within a threshold proximity of a snap guide for the single glyph of editable text 374. In response to this determination, the display module 206 generates and displays an indication 514 of the snap guide in the user interface relative to the single glyph of editable text 374.

The representation 504 shown in FIG. 5C includes rotated glyphs of editable text 516 rendered in the user interface as "Text" and a rotated single glyph of editable text 518 rendered in the user interface as "R." As illustrated, the rotated glyphs of editable text 516 include a snap guide 520 for a top side of a rotated bounding box that encloses the rotated glyphs of editable text 516, a snap guide 522 for an x-height of a font used to render the rotated glyphs of editable text 516, and a snap guide 524 for a baseline of the font used to render the rotated glyphs of editable text 516. The snap guide 520 includes a snap guide label 526 "glyphbound" which indicates that the snap guide 520 is for a side of the rotated bounding box; the snap guide 522 includes a snap guide label 528 "x-height" which indicates that the snap guide 522 is for the x-height of the font; and the snap guide 524 includes a snap guide label 530 "baseline" which indicates that that the snap guide 524 is for the baseline of the font.

The rotated single glyph of editable text 518 includes a snap guide 532 for a top side of a rotated bounding box that encloses the rotated single glyph of editable text 518, a snap guide 534 for an angled segment of an outline of the rotated single glyph of editable text 518, a snap guide 536 for a linear segment of the outline of the rotated single glyph of editable text 518, and a snap guide 538 for a vertical center of the outline of the rotated single glyph of editable text 518. The snap guide 532 includes a snap guide label 540 "glyphbound" which indicates that the snap guide 532 is for a side of the rotated bounding box; the snap guide 534 includes a snap guide label 542 "angular" which indicates that the snap guide 534 is for the angled segment of the outline of the rotated single glyph of editable text 518; the snap guide 536 includes a snap guide label 544 "linear" which indicates that the snap guide 536 is for the linear segment of the outline of the rotated single glyph of editable text 518; and the snap guide 538 includes a snap guide label 546 "center" which indicates that the snap guide 538 is for the vertical center of the outline of the rotated single glyph of editable text 518.

In one example, the display module 206 displays the snap guides 520-524 in the user interface in a manner that is different from a manner in which the snap guides 532-538 are displayed in the user interface. In this example, the display module 206 displays the snap guides 520-524 at an angle based on an angle of rotation of the rotated bounding box that encloses the rotated glyphs of editable text 516. Continuing the example, the display module 206 displays the snap guides 532-538 based on axis aligned bounds for the glyph "R."

As shown in FIG. 5D, the representation 506 includes glyphs of editable text 548 rendered in a first vertical orientation as "Royal" in the user interface and glyphs of editable text 550 rendered in a second vertical orientation as "Royal" in the user interface. The glyphs of editable text 548 include a snap guide 552 for a left side of a bounding box that encloses the glyphs of editable text 548. As illustrated, the snap guide 522 includes a snap guide label 554 "glyph-bound" which indicates that the snap guide 522 is for a side of the bounding box that encloses the glyphs of editable text 548. The glyphs of editable text 550 include a snap guide 556 for a baseline of a font used to render the glyphs of editable text 550. For example, the snap guide 556 includes a snap guide label 558 "baseline" which indicates that the snap guide 556 is for the baseline of the font used to render the glyphs of editable text 550.

The representation 508 shown in FIG. 5E includes glyphs of editable text within textboxes 560-564 which are rendered in the user interface. For instance, textbox 560 contains glyphs of editable text rendered as "Meet my subhead who supports me;" textbox 562 contains glyphs of editable text rendered as "Let's Design;" and textbox contains glyphs of editable text rendered as "When designing a recipe, magazine article or newspaper, you want to help the reader understand what the page is about prior to their reading every single word on it." The display module 206 processes the guide data 210 and/or the input data 118 to render a snap guide 566 for a baseline of a font used to render the glyphs of editable text contained in the textbox 560, a snap guide 568 for an x-height of a font used to render the glyphs of editable text contained in the textbox 562, and a snap guide 570 for a left side of a bounding box that encloses the glyphs of editable text contained in the textbox 564. For example, the snap guide 570 is also usable as a snap guide for a left side of the textbox 564 or as a snap guide for a left side of the textbox 562.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 6 is a flow diagram depicting a procedure 600 in an example implementation in which input data is received describing a position of a cursor relative to glyphs of editable text rendered in a user interface using a font and an indication of a particular snap guide is generated for display in the user interface. Input data is received describing a position of a cursor relative to glyphs of editable text rendered in a user interface using a font (block 602). For example, the computing device 102 implements the snap guide module 110 to receive the input data.

The glyphs of editable text are enclosed within a bounding box having a height that is less than a height of an em-box of the font (block 604). The snap guide module 110 encloses the glyphs of editable text within the bounding box in one example. A first group of snap guides is generated for the glyphs of editable text (block 606), the first group of snap guides including a snap guide for each side of the bounding box and a snap guide for an x-height of the font. In an example, the computing device 102 implements the snap guide module 110 to generate the first group of snap guides. An indication of a particular snap guide of the first group of snap guides is generated for display in the user interface based on the position of the cursor (block 608). For example, the snap guide module 110 generates the indication of the particular snap guide for display in the user interface.

Example System and Device

Figure 7:
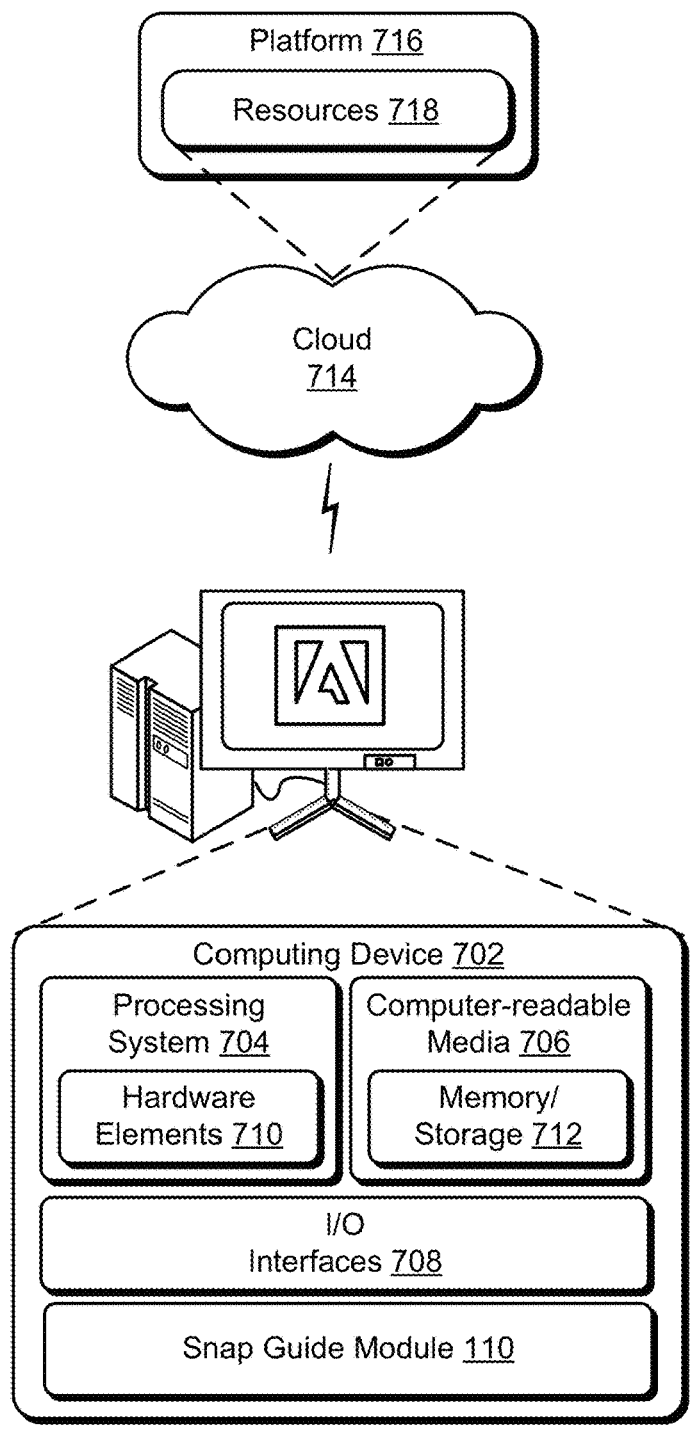
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the snap guide module 110. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

CONCLUSION

Although implementations of systems for generating snap guides relative to glyphs of editable text have been described in language specific to structural features and/or methods, it is to be understood that the appended claims are not necessarily limited to the specific features or methods described. Rather, the specific features and methods are disclosed as example implementations of systems for generating snap guides relative to glyphs of editable text, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device, input data describing a position of a cursor relative to glyphs of editable text rendered in a user interface using a font;
enclosing, by the processing device, the glyphs of the editable text within a bounding box having a height that is less than a height of an em-box of the font, the bounding box included in a font file of the font;
generating, by the processing device, a first group of snap guides for the glyphs of the editable text, the first group of snap guides including a snap guide for a top side of the bounding box, a snap guide for a bottom side of the bounding box, a snap guide for a left side of the bounding box, a snap guide for a right side of the bounding box, and a snap guide for an x-height of the font; and
generating, by the processing device for display in the user interface, an indication of a particular snap guide of the first group of snap guides based on the position of the cursor.

2. The method as described in claim 1, further comprising:
dividing the bounding box into visual regions based at least partially on the x-height of the font;
generating a second group of snap guides based on portions of the glyphs of the editable text included in the visual regions, each snap guide included in the second group of snap guides intersects the glyphs of the editable text; and
identifying one snap guide of the second group of snap guides that has a greatest area of intersection with the glyphs of the editable text.

3. The method as described in claim 2, wherein dividing the bounding box into the visual regions is based at least partially on an ascender and a descender of the font.

4. The method as described in claim 2, further comprising generating an indication of the one snap guide for display in the user interface relative to the glyphs of the editable text, the indication of the one snap guide including a snap guide label adjacent to an end of the one snap guide.

5. The method as described in claim 4, wherein the snap guide label indicates that the one snap guide is a member of the second group of snap guides.

6. The method as described in claim 4, further comprising generating an indication of a particular glyph for display in the user interface based on a visual correspondence between the particular glyph and the one snap guide.

7. The method as described in claim 1, wherein the indication of the particular snap guide includes a label that indicates the particular snap guide is a member of the first group of snap guides.

8. The method as described in claim 1, wherein the indication of the particular snap guide includes an indication of an origination of the particular snap guide with respect to the glyphs of the editable text.

9. The method as described in claim 8, further comprising:
determining the position of the cursor is above the glyphs of the editable text in the user interface; and
generating a snap guide label for display in the user interface below the indication of the origination of the particular snap guide.

10. The method as described in claim 8, further comprising:
determining the position of the cursor is below the glyphs of the editable text in the user interface; and
generating a snap guide label for display in the user interface on a left side of the indication of the origination of the particular snap guide.

11. The method as described in claim 1, further comprising:
receiving additional input data describing a selection of a single glyph of the glyphs of the editable text; and
generating an indication of a single glyph snap guide for display in the user interface that includes a snap guide label adjacent to an end of the single glyph snap guide.

12. A system comprising:
a memory component; and
a processing device coupled to the memory component, the processing device to perform operations comprising:
receiving input data describing a position of a cursor relative to glyphs of editable text rendered in a user interface using a font;
enclosing the glyphs of the editable text within a bounding box having a height that is less than a height of an em-box of the font, the bounding box included in a font file of the font;
generating a first group of snap guides for the glyphs of the editable text, the first group of snap guides including a snap guide for a top side of the bounding box, a snap guide for a bottom side of the bounding box, a snap guide for a left side of the bounding box, a snap guide for a right side of the bounding box, and a snap guide for an x-height of the font; and
generating an indication of a particular snap guide of the first group of snap guides for display in the user interface based on the position of the cursor, the indication of the particular snap guide includes a snap guide label adjacent to an end of the particular snap guide.

13. The system as described in claim 12, wherein the indication of the particular snap guide includes an indication of an origination of the particular snap guide with respect to the glyphs of the editable text.

14. The system as described in claim 12, wherein the operations further comprise:
- dividing the bounding box into visual regions based at least partially on the x-height of the font, an ascender of the font, and a descender of the font;
- generating a second group of snap guides based on portions of the glyphs of the editable text included in the visual regions, each snap guide included in the second group of snap guides intersects the glyphs of the editable text; and
- identifying one snap guide of the second group of snap guides that has a greatest area of intersection with the glyphs of the editable text.

15. The system as described in claim 14, wherein the operations further comprise generating an indication of the one snap guide for display in the user interface relative to the glyphs of the editable text, the indication of the one snap guide including an additional snap guide label adjacent to an end of the one snap guide.

16. A non-transitory computer-readable storage medium storing executable instructions, which when executed by a processing device, cause the processing device to perform operations comprising:
- receiving input data describing a position of a cursor relative to glyphs of editable text rendered in a user interface using a font;
- enclosing the glyphs of the editable text within a bounding box having a height that is less than a height of an em-box of the font, the bounding box included in a font file of the font;
- dividing the bounding box into visual regions based at least partially on an x-height of the font;
- generating a group of snap guides based at least partially on portions of the glyphs of the editable text included in the visual regions, the group of snap guides including a snap guide for a top side of the bounding box, a snap guide for a bottom side of the bounding box, a snap guide for a left side of the bounding box, a snap guide for a right side of the bounding box, and a snap guide for the x-height of the font; and
- generating an indication of a particular snap guide of the group of snap guides for display in the user interface based on the position of the cursor.

17. The non-transitory computer-readable storage medium as described in claim 16, wherein dividing the bounding box into the visual regions is based at least partially on an ascender and a descender of the font.

18. The non-transitory computer-readable storage medium as described in claim 16, wherein the indication of the particular snap guide includes an indication of an origination of the particular snap guide with respect to the glyphs of the editable text.

19. The non-transitory computer-readable storage medium as described in claim 18, wherein the operations further comprise:
- determining the position of the cursor is above the glyphs of the editable text in the user interface; and
- displaying a snap guide label below the indication of the origination of the particular snap guide in the user interface.

20. The non-transitory computer-readable storage medium as described in claim 18, wherein the operations further comprise:
- determining the position of the cursor is below the glyphs of the editable text in the user interface; and
- displaying a snap guide label on a left side of the indication of the origination of the particular snap guide in the user interface.

\* \* \* \* \*